ns013B2

United States Patent
Singh

(10) Patent No.: US 9,428,013 B2
(45) Date of Patent: Aug. 30, 2016

(54) TIRE WEAR STATE ESTIMATION SYSTEM UTILIZING CORNERING STIFFNESS AND METHOD

(71) Applicant: The Goodyear Tire & Rubber Company, Akron, OH (US)

(72) Inventor: Kanwar Bharat Singh, Stow, OH (US)

(73) Assignee: The Goodyear Tire & Rubber Company, Akron, OH (US)

(*) Notice: Subject to any disclaimer, the term of this patent is extended or adjusted under 35 U.S.C. 154(b) by 0 days.

(21) Appl. No.: 14/700,264

(22) Filed: Apr. 30, 2015

(65) Prior Publication Data

US 2015/0231932 A1 Aug. 20, 2015

Related U.S. Application Data

(63) Continuation of application No. 13/973,262, filed on Aug. 22, 2013, now abandoned.

(51) Int. Cl.
*B60C 11/24* (2006.01)

(52) U.S. Cl.
CPC .................. *B60C 11/246* (2013.04)

(58) Field of Classification Search
None
See application file for complete search history.

(56) References Cited

U.S. PATENT DOCUMENTS

| | | | |
|---|---|---|---|
| 7,000,462 B2* | 2/2006 | Hillenmayer | B60C 23/0488 73/146.5 |
| 7,885,750 B2 | 2/2011 | Lu | |
| 8,661,885 B1 | 3/2014 | Singh et al. | |
| 2003/0192375 A1* | 10/2003 | Sugai | B60C 23/061 73/146 |
| 2004/0049303 A1 | 3/2004 | Levy et al. | |
| 2005/0087593 A1* | 4/2005 | Benedict | B60C 23/0493 235/375 |
| 2006/0156790 A1* | 7/2006 | Bocquillon | B60C 11/24 73/8 |
| 2006/0201240 A1* | 9/2006 | Morinaga | B60T 8/1725 73/146 |
| 2008/0243348 A1* | 10/2008 | Svendenius | B60T 8/172 701/90 |
| 2009/0024269 A1 | 1/2009 | Shorten et al. | |
| 2010/0060443 A1* | 3/2010 | Wakao | B60C 11/246 340/444 |
| 2010/0131229 A1 | 5/2010 | Nardi et al. | |
| 2010/0174437 A1* | 7/2010 | Benedict | B60T 8/1725 701/31.4 |
| 2015/0090023 A1 | 4/2015 | Masago | |

FOREIGN PATENT DOCUMENTS

DE     EP 1293362 B1 * 9/2007 ................ B60P 5/00

OTHER PUBLICATIONS

Estimation of vehicle sideslip, tire force, and wheel cornering stiffness by Guilaume Baffet, published in Jun. 2009.*

* cited by examiner

*Primary Examiner* — John R Olszewski
*Assistant Examiner* — Jess Whittington
(74) *Attorney, Agent, or Firm* — Edward T. Kennedy

(57) ABSTRACT

A tire wear state estimation system includes as inputs an axle force estimation, a measured tire inflation pressure; a tire load estimation; a tire cornering stiffness estimation; and a tire identification by which a specific tire-based correlation model correlates tire inflation pressure, the tire load estimation, the tire cornering stiffness estimation, and the vehicle-based sensor axle force estimation.

9 Claims, 31 Drawing Sheets

US 9,428,013 B2

TIRE WEAR STATE ESTIMATION SYSTEM UTILIZING CORNERING STIFFNESS AND METHOD

FIELD OF THE INVENTION

The invention relates generally to tire monitoring systems for collecting measured tire parameter data during vehicle operation and, more particularly, to a system and method for estimating tire wear state based upon such measurements.

BACKGROUND OF THE INVENTION

Vehicle-mounted tires may be monitored by tire pressure monitoring systems (TPMS) which measure tire parameters such as pressure and temperature during vehicle operation. Data from TPMS tire-equipped systems is used to ascertain the status of a tire based on measured tire parameters and alert the driver of conditions, such as low tire pressure or leakage, which may require remedial maintenance. Sensors within each tire are either installed at a pre-cure stage of tire manufacture or in a post-cure assembly to the tire.

Other factors such as tire wear state are important considerations for vehicle operation and safety. It is accordingly further desirable to measure tire wear state and communicate wear state to vehicle systems such as braking and stability control systems in conjunction with the measured tire parameters of pressure and temperature.

SUMMARY OF THE INVENTION

According to one aspect of the invention, a tire wear state estimation system includes as inputs to a tire-specific correlation model a measured tire inflation pressure; a tire load estimation; a tire cornering stiffness estimation; and a tire identification by which the correlation model makes a tire wear state estimation.

In another aspect, the tire cornering stiffness estimator has inputs of vehicle operational measurements from one or more on-board vehicle-based sensor(s). The cornering stiffness estimator model may incorporate vehicle side slip angle estimations in a "Beta" inclusive embodiment, or exclude vehicle side slip angle in a "Beta-less" model embodiment. The cornering stiffness estimator in both the Beta and Beta-less alternative embodiments utilizes an estimation of axial force components from an axle force estimator.

The tire wear state estimation system, in a further aspect, uses in the calculation of an estimated tire cornering stiffness a recursive least squares algorithm with forgetting factor based on a polynomial model capturing a dependency between axle force component estimation and the tire slip angle estimation.

Definitions

"ANN" or "Artificial Neural Network" is an adaptive tool for non-linear statistical data modeling that changes its structure based on external or internal information that flows through a network during a learning phase. ANN neural networks are non-linear statistical data modeling tools used to model complex relationships between inputs and outputs or to find patterns in data.

"Aspect ratio" of the tire means the ratio of its section height (SH) to its section width (SW) multiplied by 100 percent for expression as a percentage.

"Asymmetric tread" means a tread that has a tread pattern not symmetrical about the center plane or equatorial plane EP of the tire.

"Axial" and "axially" means lines or directions that are parallel to the axis of rotation of the tire.

"CAN bus" is an abbreviation for controller area network.

"Chafer" is a narrow strip of material placed around the outside of a tire bead to protect the cord plies from wearing and cutting against the rim and distribute the flexing above the rim.

"Circumferential" means lines or directions extending along the perimeter of the surface of the annular tread perpendicular to the axial direction.

"Equatorial Centerplane (CP)" means the plane perpendicular to the tire's axis of rotation and passing through the center of the tread.

"Footprint" means the contact patch or area of contact created by the tire tread with a flat surface as the tire rotates or rolls.

"Groove" means an elongated void area in a tire wall that may extend circumferentially or laterally about the tire wall. The "groove width" is equal to its average width over its length. A grooves is sized to accommodate an air tube as described.

"Inboard side" means the side of the tire nearest the vehicle when the tire is mounted on a wheel and the wheel is mounted on the vehicle.

"Kalman Filter" is a set of mathematical equations that implement a predictor-corrector type estimator that is optimal in the sense that it minimizes the estimated error covariance when some presumed conditions are met.

"Lateral" means an axial direction.

"Lateral edges" means a line tangent to the axially outermost tread contact patch or footprint as measured under normal load and tire inflation, the lines being parallel to the equatorial centerplane.

"Luenberger Observer" is a state observer or estimation model. A "state observer" is a system that provide an estimate of the internal state of a given real system, from measurements of the input and output of the real system. It is typically computer-implemented, and provides the basis of many practical applications.

"MSE" is an abbreviation for Mean square error, the error between and a measured signal and an estimated signal which the Kalman Filter minimizes.

"Net contact area" means the total area of ground contacting tread elements between the lateral edges around the entire circumference of the tread divided by the gross area of the entire tread between the lateral edges.

"Non-directional tread" means a tread that has no preferred direction of forward travel and is not required to be positioned on a vehicle in a specific wheel position or positions to ensure that the tread pattern is aligned with the preferred direction of travel. Conversely, a directional tread pattern has a preferred direction of travel requiring specific wheel positioning.

"Outboard side" means the side of the tire farthest away from the vehicle when the tire is mounted on a wheel and the wheel is mounted on the vehicle.

"Peristaltic" means operating by means of wave-like contractions that propel contained matter, such as air, along tubular pathways.

"Pressure Sensor" a commercially available device for monitoring and measuring air pressure; such devices operational to transmit wirelessly measured pressure data to a remote computer for data processing.

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Sipe" means small slots molded into the tread elements of the tire that subdivide the tread surface and improve traction, sipes are generally narrow in width and close in the tires footprint as opposed to grooves that remain open in the tire's footprint.

"SMC Observer" is a sliding mode observer for nonlinear systems that brings the estimation error for all estimated states to zero in a finite (and arbitrarily small) time.

"Tread element" or "traction element" means a rib or a block element defined by having a shape adjacent grooves.

"Tread Arc Width" means the arc length of the tread as measured between the lateral edges of the tread.

BRIEF DESCRIPTION OF THE DRAWINGS

The invention will be described by way of example and with reference to the accompanying drawings in which.

DETAILED DESCRIPTION OF THE INVENTION

Figure 1B:
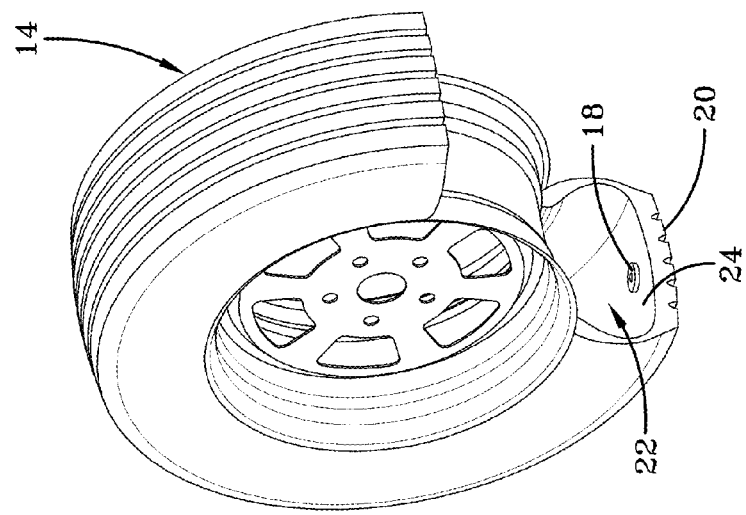
FIG. 1B is a perspective view of a tire having a tire pressure monitoring system incorporated into a tread region.
Figure 1A:
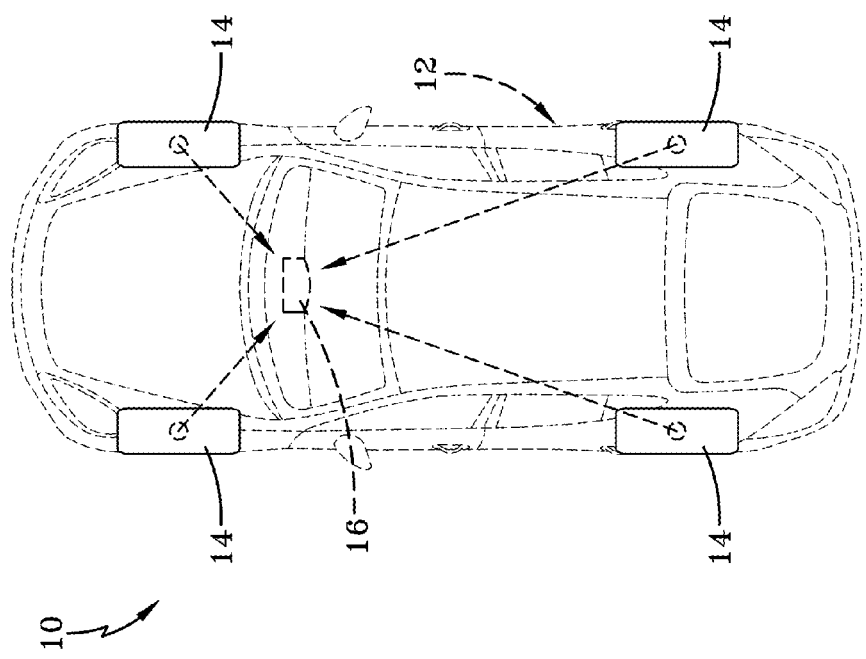
FIG. 1A is a vehicle diagram showing tires equipped with a tire pressure monitoring system communicating with an onboard data processor.

Referring to FIGS. 1A and 1B, a vehicle tread wear system 10 is disclosed for a vehicle 12 having a set of tires 14. The system 12 monitors the tread wear level in the tires 14 and transmits a wear level estimation to a vehicle based monitor 16 to advise the vehicle's operator as to tire wear status. Each tire 14 is provided with a tire pressure monitoring device 18 that is mounted to an inner liner surface 24 facing a tire cavity 22.

The device 18 mounts opposite the tread region 20 of the tire and includes a pressure sensor. A tire identification transducer may be incorporated into the TPMS device 18 within a common housing or attached to the tire in a separate housing. A "pressure sensor", as used herein, measures air pressure within the tire cavity and generally acts as a transducer that generates an electrical signal representative of the pressure imposed. Pressure sensors operational in the subject system are commercially available and include a transmitter for transmitting a measured pressure signal to a remote device such as a computer for data processing. Pressure sensors can alternatively be called pressure transducers, pressure transmitters, pressure senders. While the vehicle shown is a passenger vehicle, any tire-mounted vehicle may be used in the practice of the subject tread wear estimation system 10.

Figure 2:
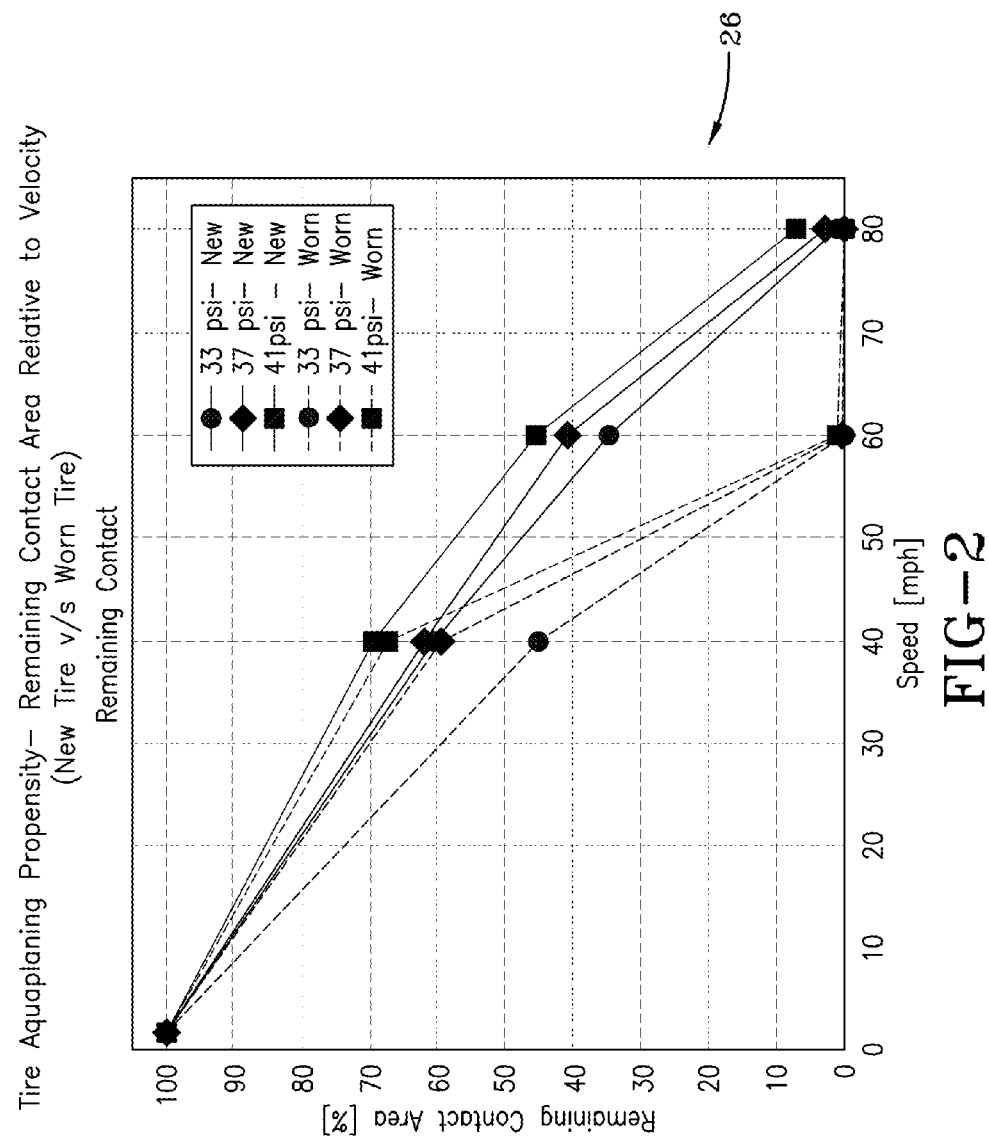
FIG. 2 is a graph of contact area (percent) vs. speed [mph] illustrating aquaplaning propensity between a new and worn tire.

FIG. 2 is a graph 26 of contact area (percent) vs. speed [mph] illustrating aquaplaning propensity between a new and worn tire. The aquaplaning (tire patch length) propensity, as indicated by the graph, increases as a tire wears. The pressure inflation of the tire is also a factor in determining aquaplaning propensity, a low inflation pressure increasing the patch length of the tire. Thus, both inflation pressure of a tire and its level of tread wear affect aquaplaning and are factors of interest to a driver in operating a vehicle.

Figure 3:
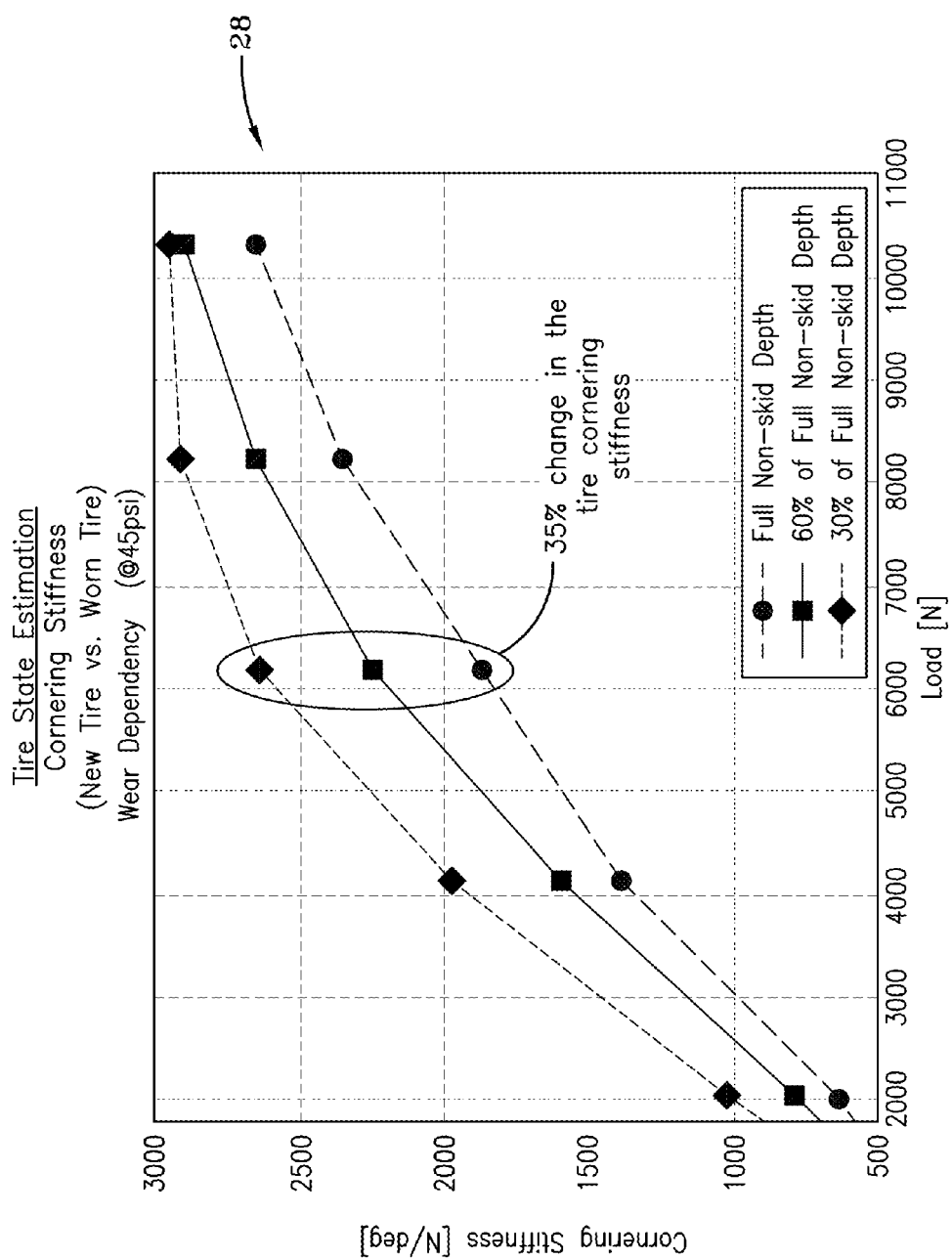
FIG. 3 is a graph correlating cornering stiffness [N/deg] vs. load showing wear dependency of a new vs. worn tire to cornering stiffness.
Figure 4A:
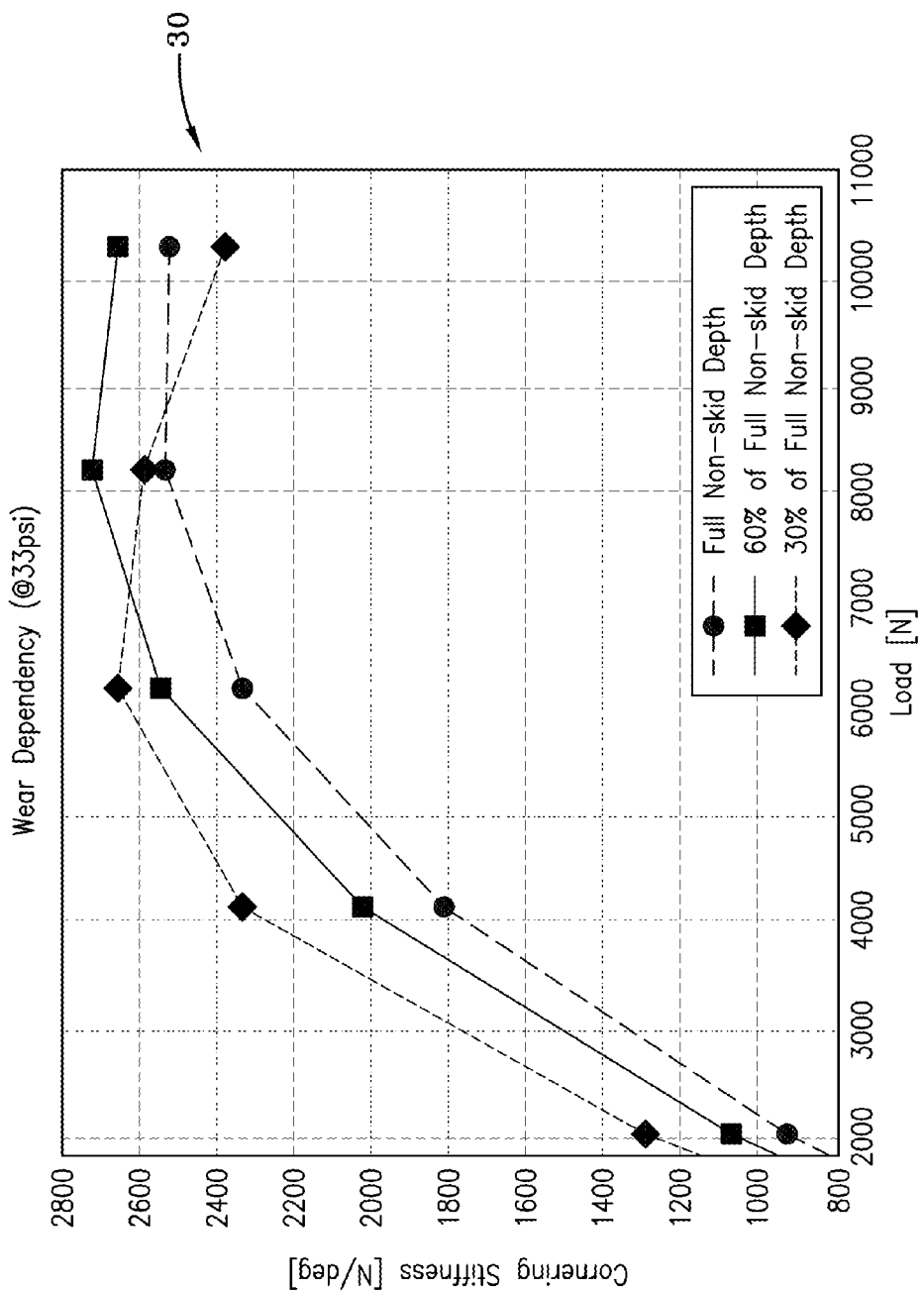
FIG. 4A is a graph of cornering stiffness vs. load for different tire wear levels showing wear dependency at 33 psi.
Figure 4B:
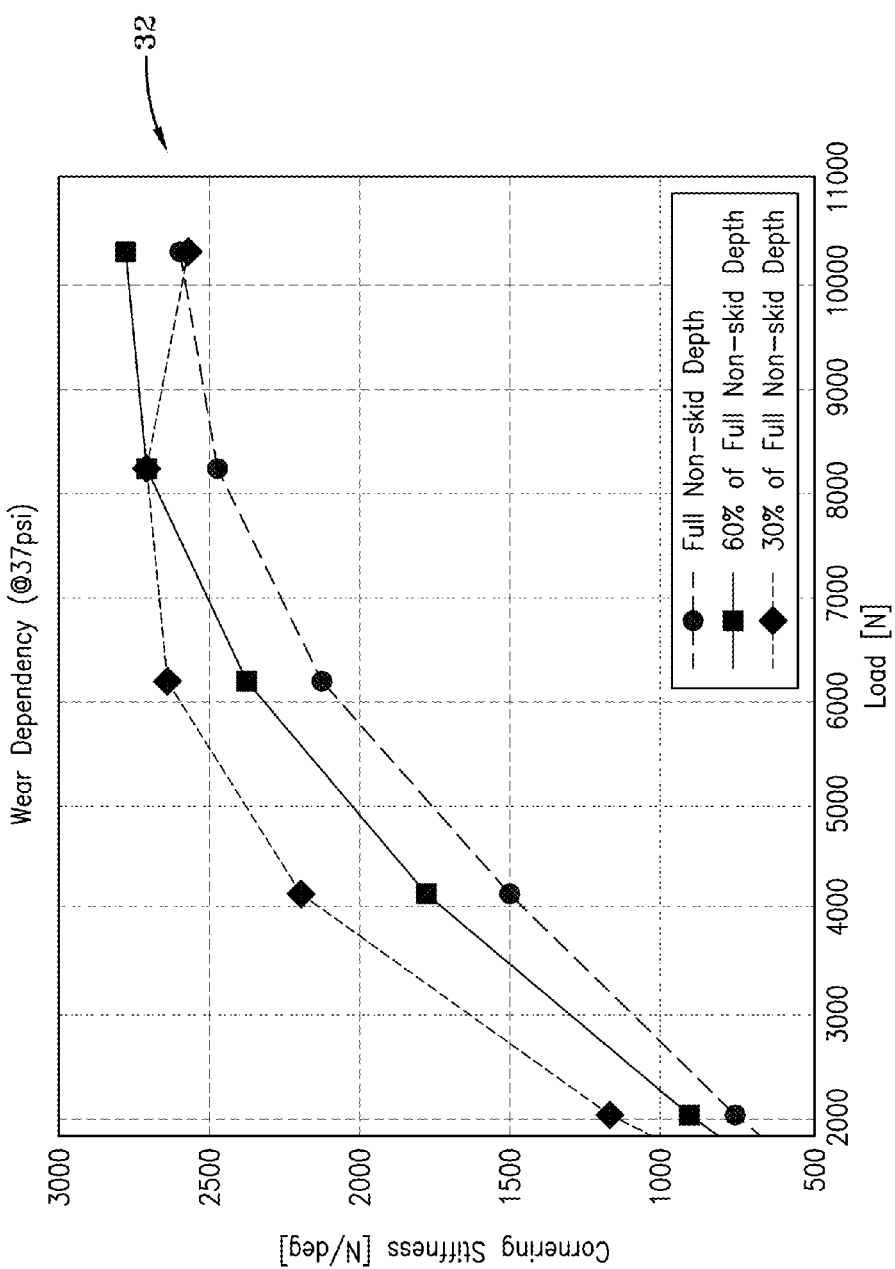
FIG. 4B is a graph of cornering stiffness vs. load for different tire wear levels showing wear dependency at 37 psi.
Figure 4C:
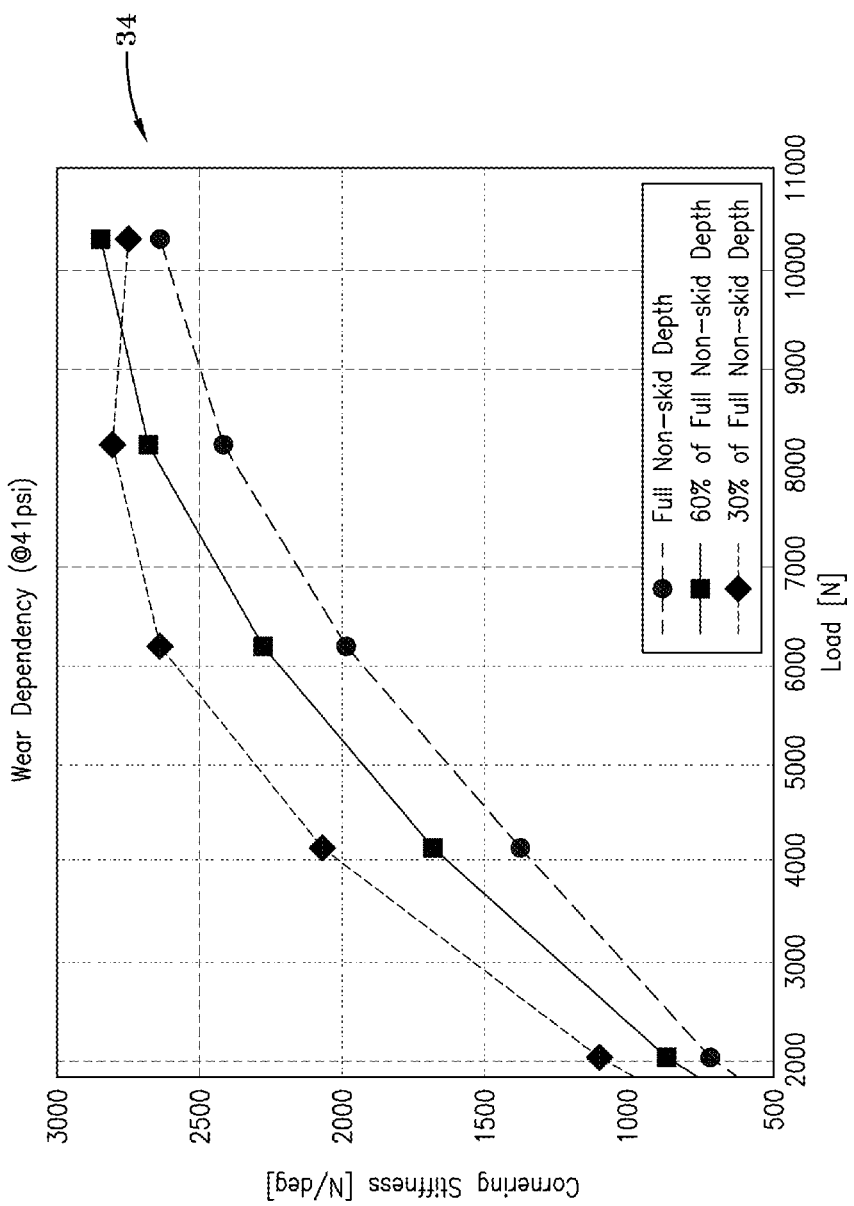
FIG. 4C is a graph of cornering stiffness vs. load for different tire wear levels showing wear dependency at 41 psi.
Figure 4D:
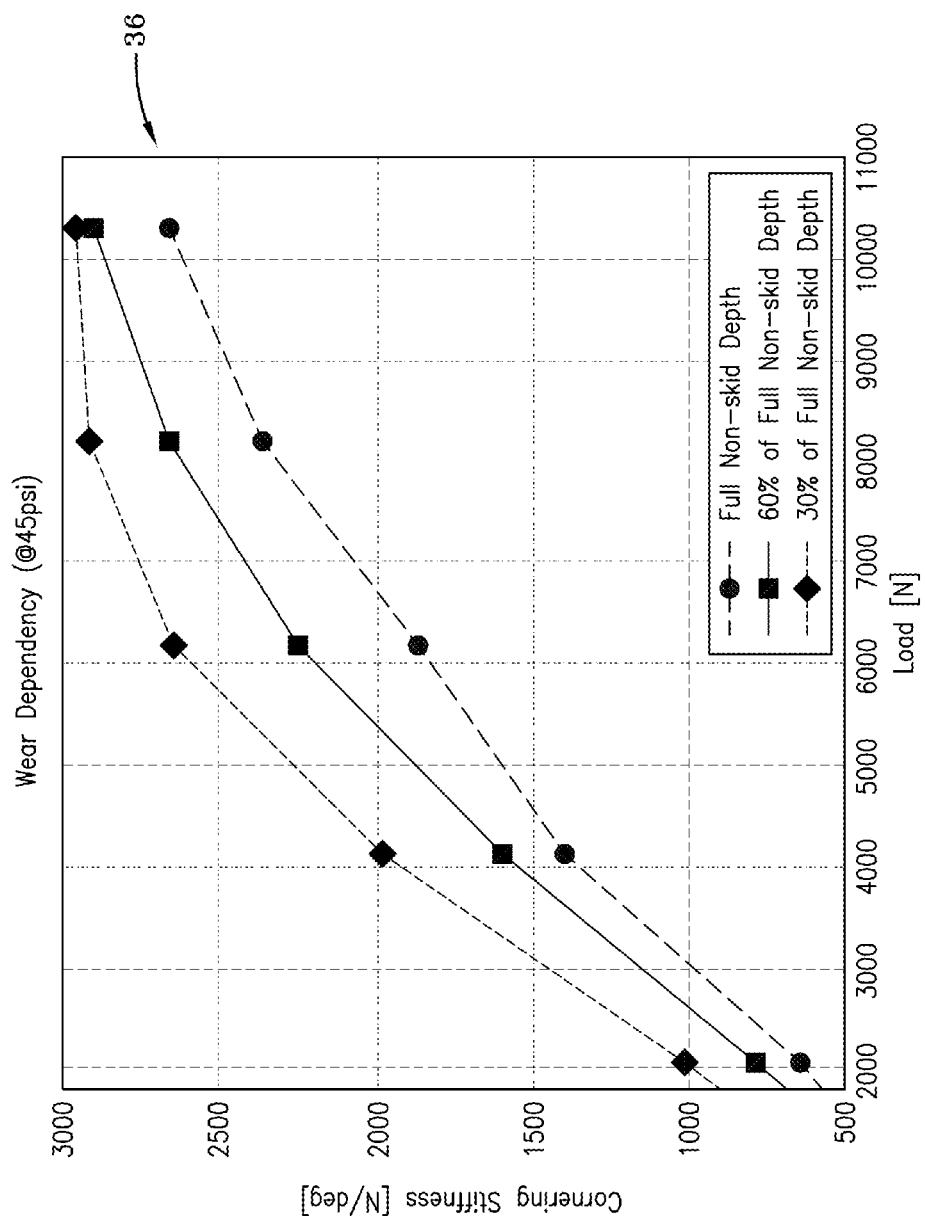
FIG. 4D is a graph of cornering stiffness vs. load for different tire wear levels showing wear dependency at 45 psi.

FIG. 3 is a graph 28 illustrating wear dependency tire cornering stiffness [N/deg] and tire load at a tire inflation of 45 psi. As seen from the graph, cornering stiffness increases with an increase in tire load. As such, tire load level is an important factor in determining the cornering stiffness of a tire. Moreover, the FIG. 3 graphs show that tread depth affects cornering stiffness for a given tire load. Full, non-skid tread, 60 percent tread depth, and 30 percent tread depth conditions are shown separately and demonstrate the correlation between cornering stiffness and tread depth. Stated differently, wearing of a tire is dependent on both tire load and tire corner stiffness.

FIGS. 4A, 4B, 4C and 4D are graphs showing the tire wear dependency between cornering stiffness and load for a tire inflated to 33 psi, 37 psi, 41 psi and 47 psi, respectively. The dependency of the tire cornering stiffness on the tire wear state shown in the graphs validates the correlation model disclosed herein which utilizes the dependency in achieving a tire wear estimation. Cornering stiffness (Cy) changes with, and is a function of variables: tire inflation pressure, load, wear level, and tire construction (tire identification or "ID").

Figure 5:
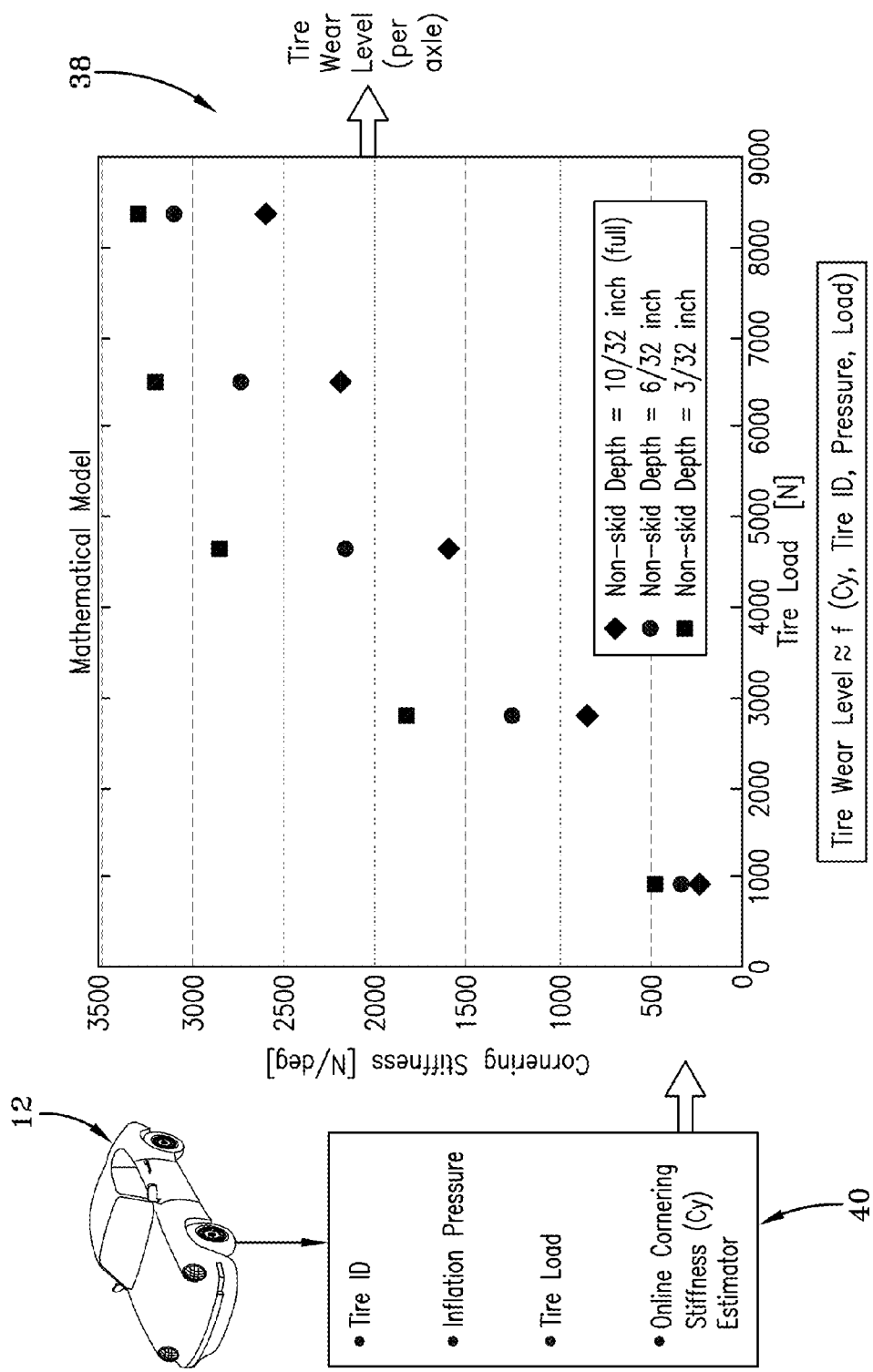
FIG. 5 is a graph of cornering stiffness vs. load for three different tire wear levels showing how tire wear level is a function of, and may be estimated by, tire ID, inflation pressure, tire load, and online cornering stiffness estimation (Cy).

FIG. 5 shows in graph 38 a simplistic model for indirect wear estimation based on the correlation between such variables and tire wear level. The variables tire ID, inflation pressure, and tire load will determine or influence online cornering stiffness Cy. The correlation between estimated Cy and measured tire load will further then make an estimation of tire wear level per axle possible. Based on the dependencies summarized above and illustrated by the model graph 38, tire wear state may be estimated by using a mathematical model capturing the dependencies between the tire wear state, inflation pressure, tire load, and the tire cornering stiffness.

Figure 6:
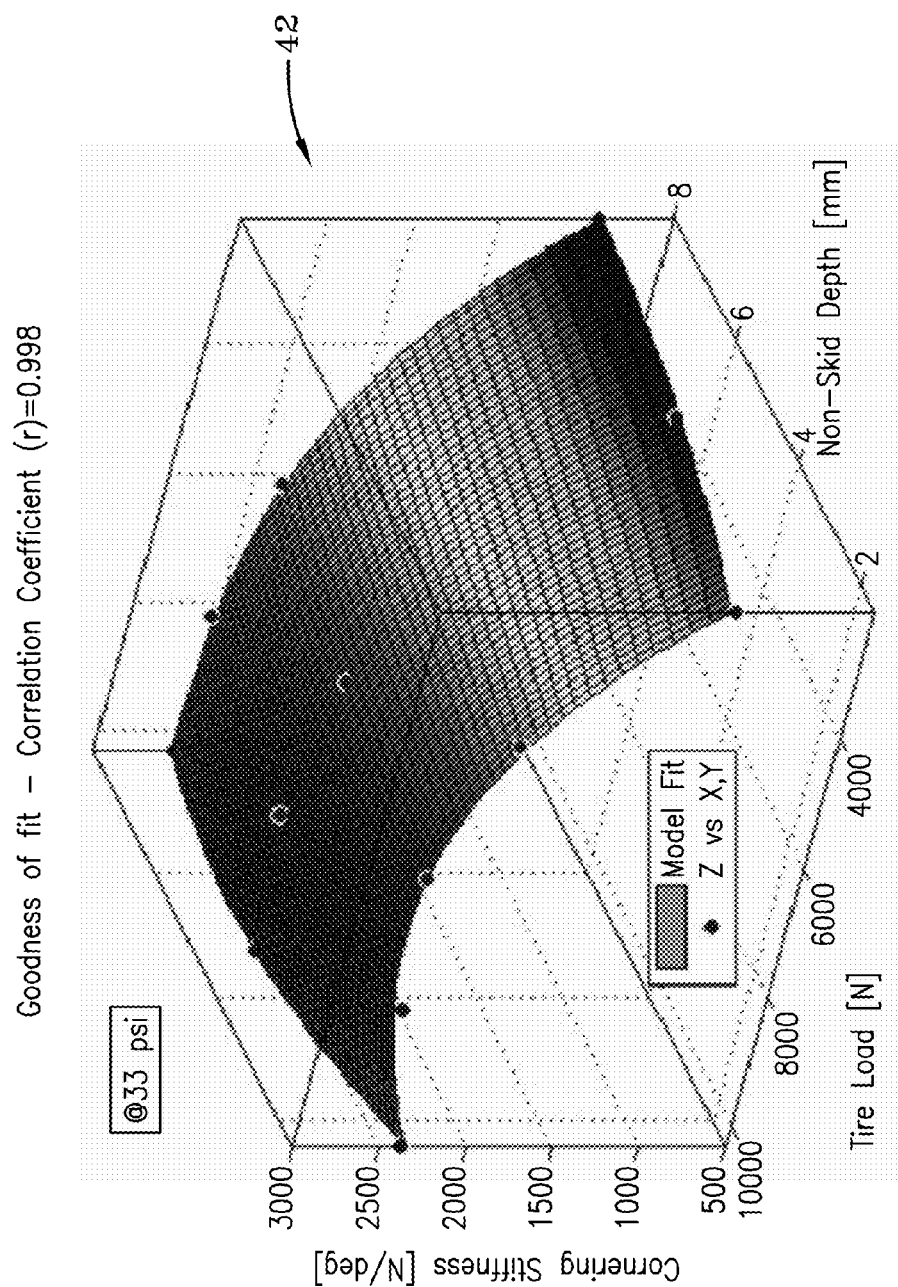
FIG. 6 is a three dimensional graph of cornering stiffness [N/deg] vs. tire load (N) vs. non-skid depth [mm] and illustrating the goodness of fit between the model and Z vs. X, Y at a tire inflation pressure of 33 psi.
Figure 7A:
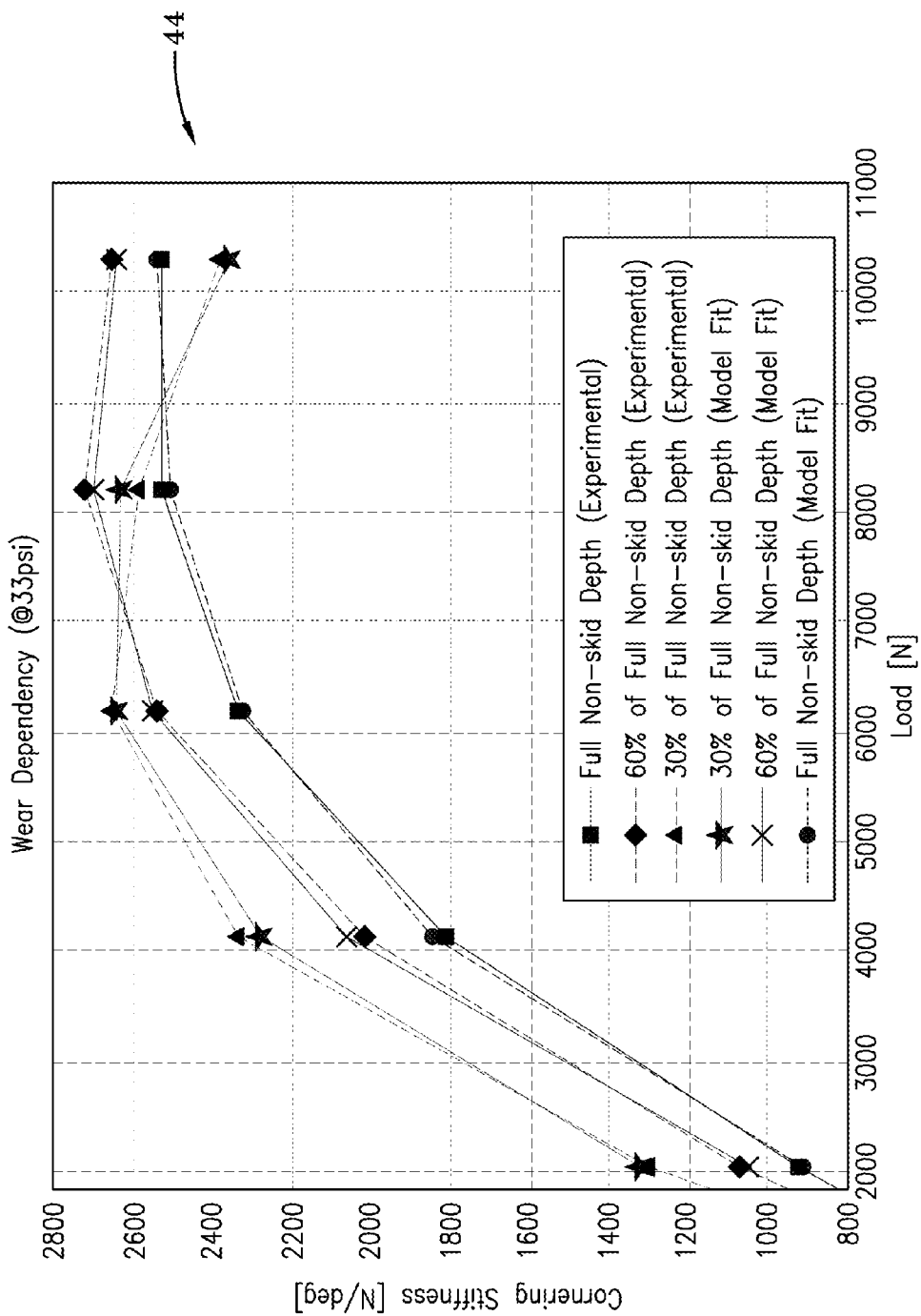
FIG. 7A is a graph of cornering stiffness vs. load for different tire wear levels comparing wear dependency at 33 psi between experimental results and model fit.
Figure 7B:
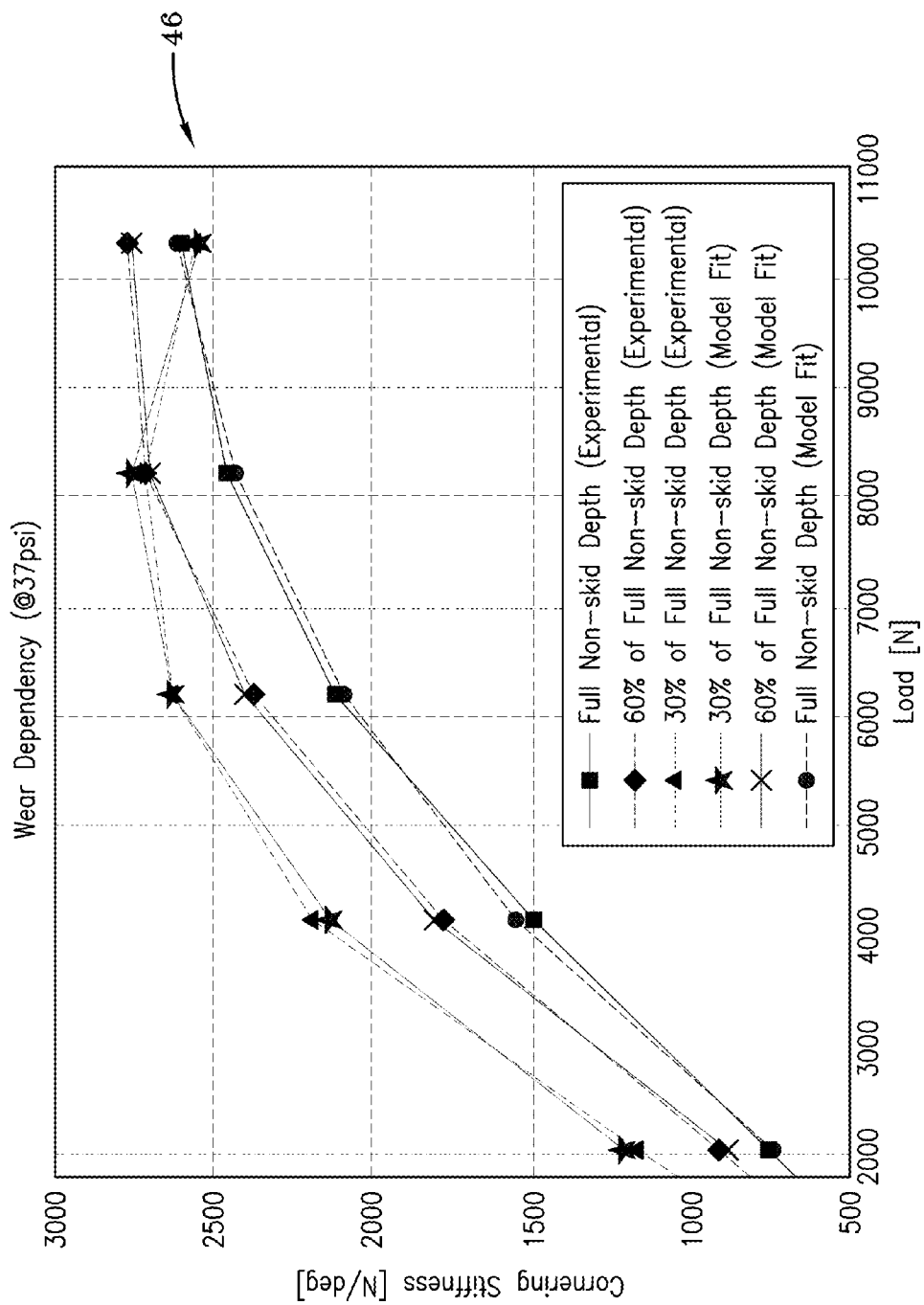
FIG. 7B is a graph of cornering stiffness vs. load for different tire wear levels comparing wear dependency at 37 psi between experimental results and model fit.
Figure 7C:
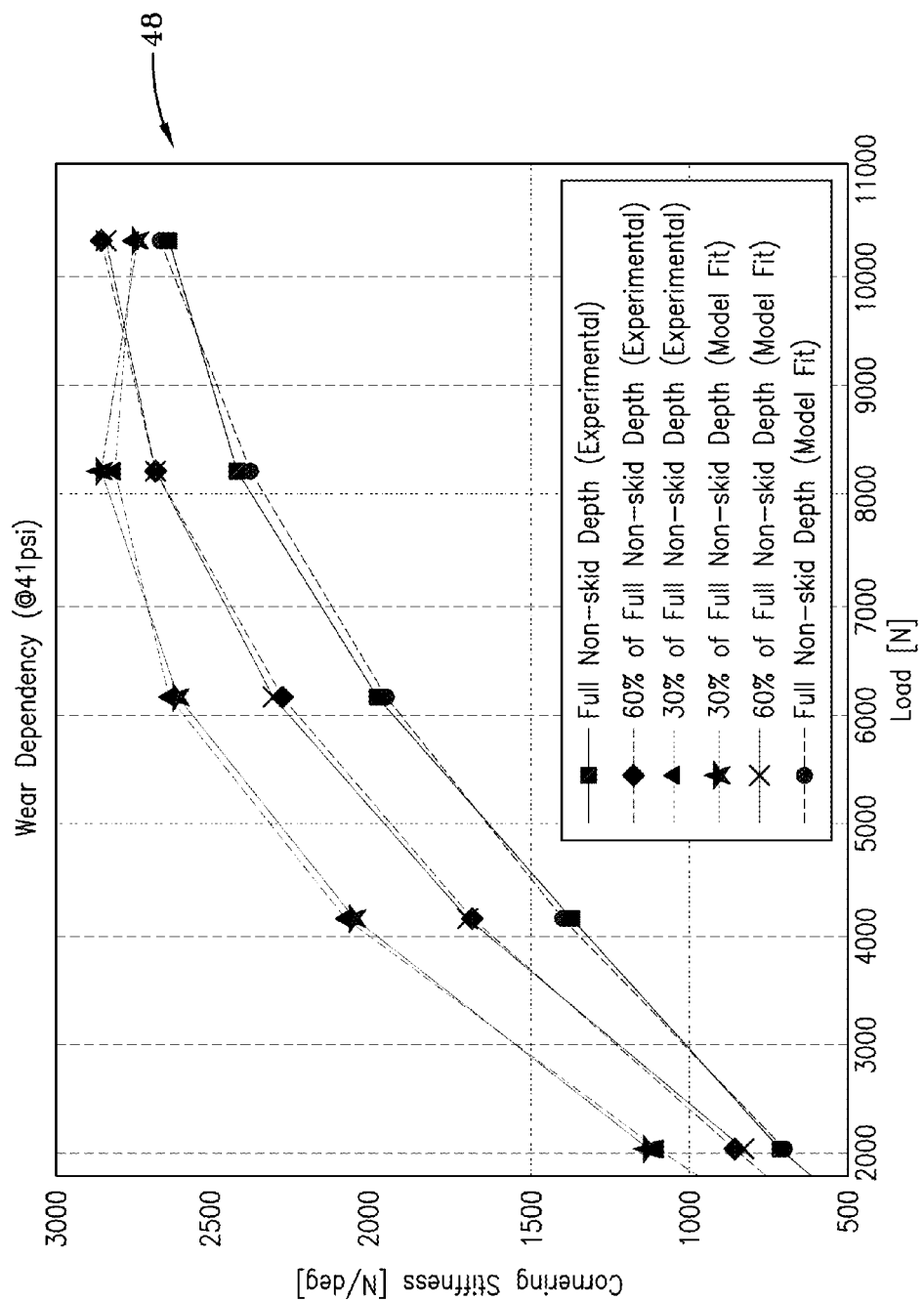
FIG. 7C is a graph of cornering stiffness vs. load for different tire wear levels comparing wear dependency at 41 psi between experimental results and model fit.
Figure 7D:
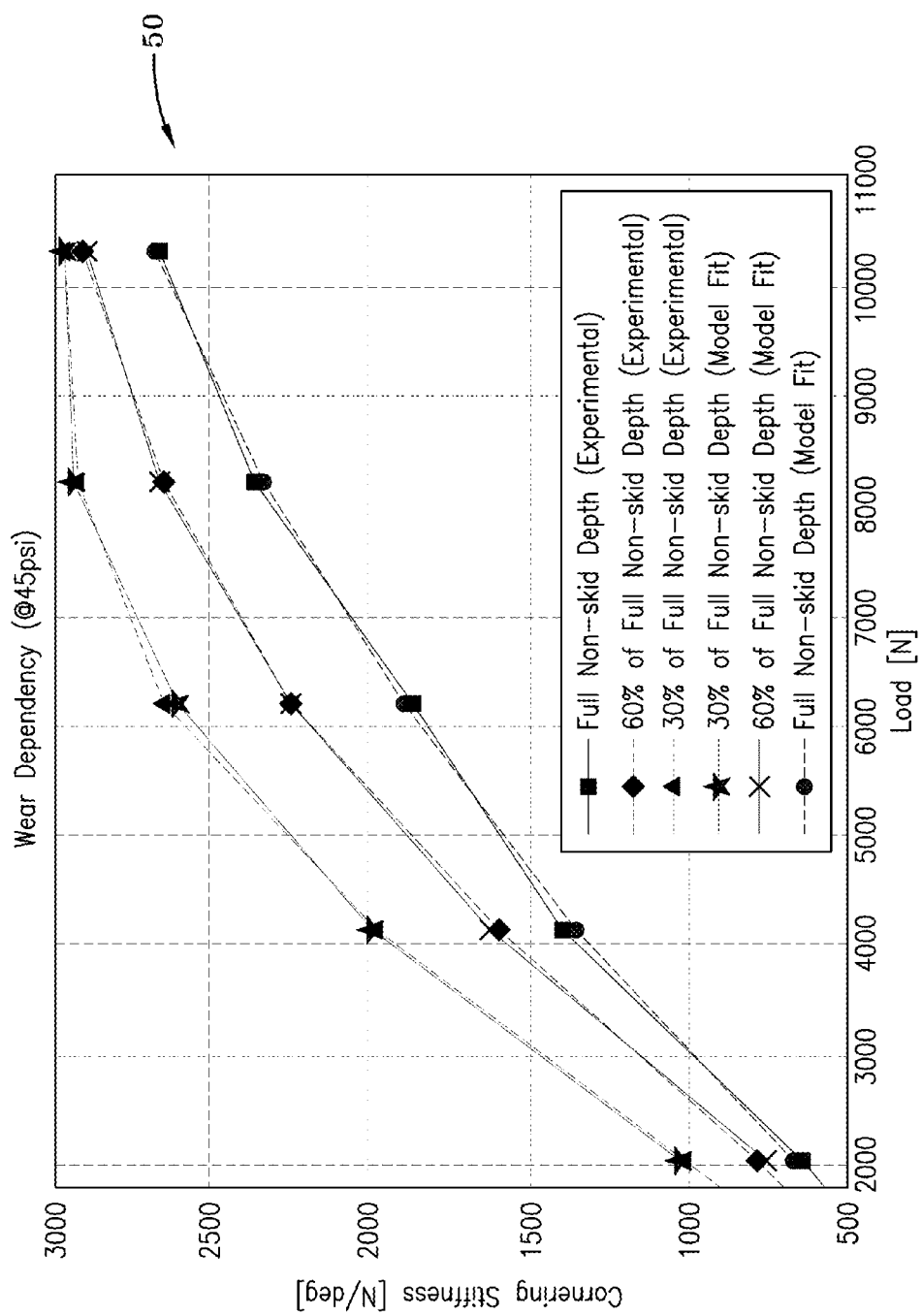
FIG. 7D is a graph of cornering stiffness vs. load for different tire wear levels comparing wear dependency at 47 psi between experimental results and model fit.

FIG. 6 is a three dimensional graph 42 of cornering stiffness [N/deg] vs. tire load (N) vs. non-skid depth [mm] and illustrating the goodness of fit between the model and Z vs. X, Y at a tire inflation pressure of 33 psi. For the test conducted, a Goodyear Eagle F1 Asymmetric tire, size 255/45ZR19, was use. It was found that a polynomial model (third-order in load and second-order in tread depth) is found to give an acceptable fit. The Model Fit is as follows for the model of FIG. 6:

$$z = p00 + p10*x + p01*y + p20*x^2 + p11*x*y + p02*y^2 + p21*x^2*y + p12*x*y^2 + p03*y^3$$

where x: tread depth, y: load, and z: cornering stiffness (Cy).

Figure 8A:
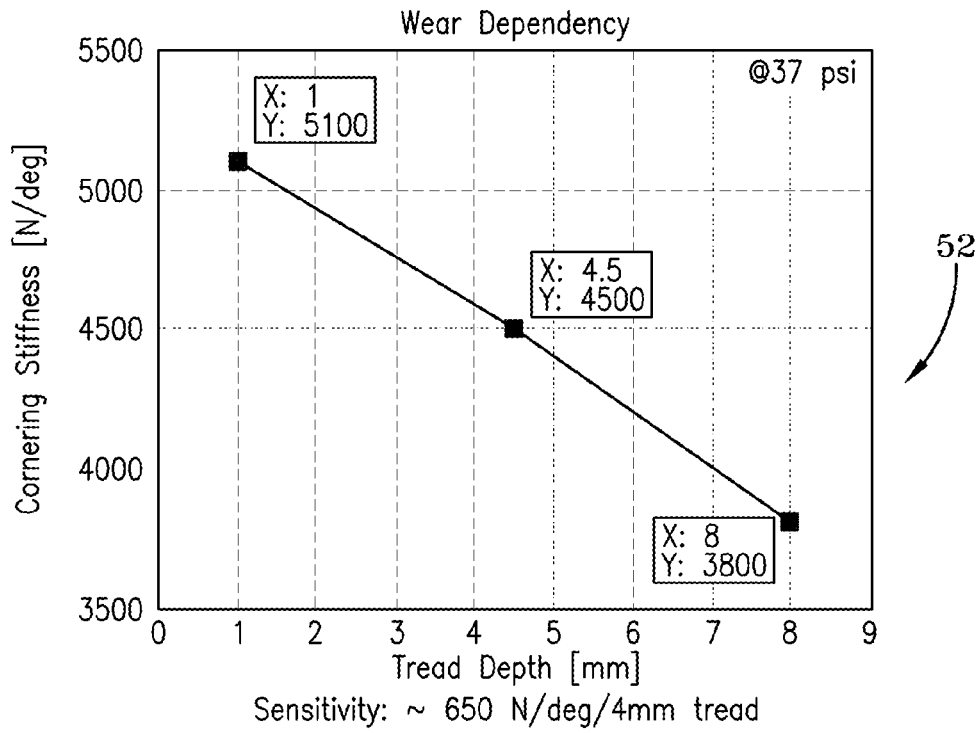
FIG. 8A is a graph of cornering stiffness [N/deg] vs. tread depth [mm] showing wear dependency and sensitivity at a tire inflation pressure of 37 psi.
Figure 8B:
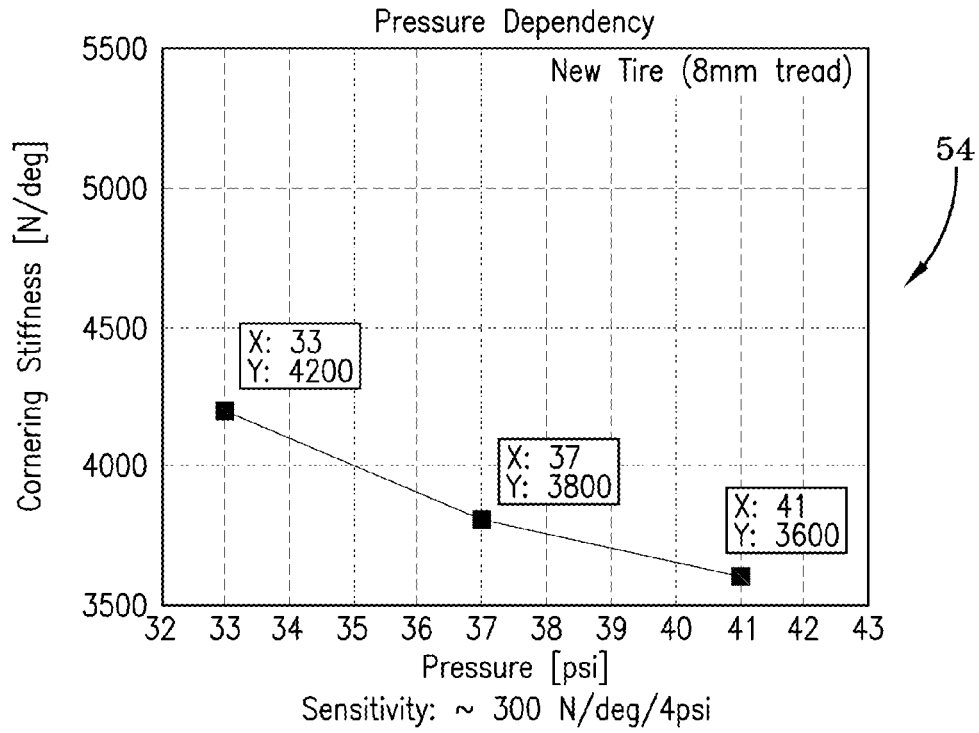
FIG. 8B is a graph of cornering stiffness [N/deg] vs. pressure [psi] showing pressure dependency and sensitivity in a new tire (8 mm tread).

FIGS. 7A through 7D show graphs 44, 46, 48, 50 summarizing model fitting results with pressure adapted coefficients. The model coefficients show expected pressure and tire tread wear level dependency. The graphs of cornering stiffness vs. load are for pressures of 33, 37, 41, and 45 psi, respectively. FIG. 8A is a graph of cornering stiffness [N/deg] vs. tread depth [mm] showing cornering stiffness vs. wear dependency and sensitivity at a tire inflation pressure of 37 psi. FIG. 8B is a graph of cornering stiffness [N/deg] vs. pressure [psi] showing pressure dependency and sensitivity in a new tire (8 mm tread).

Figure 9:
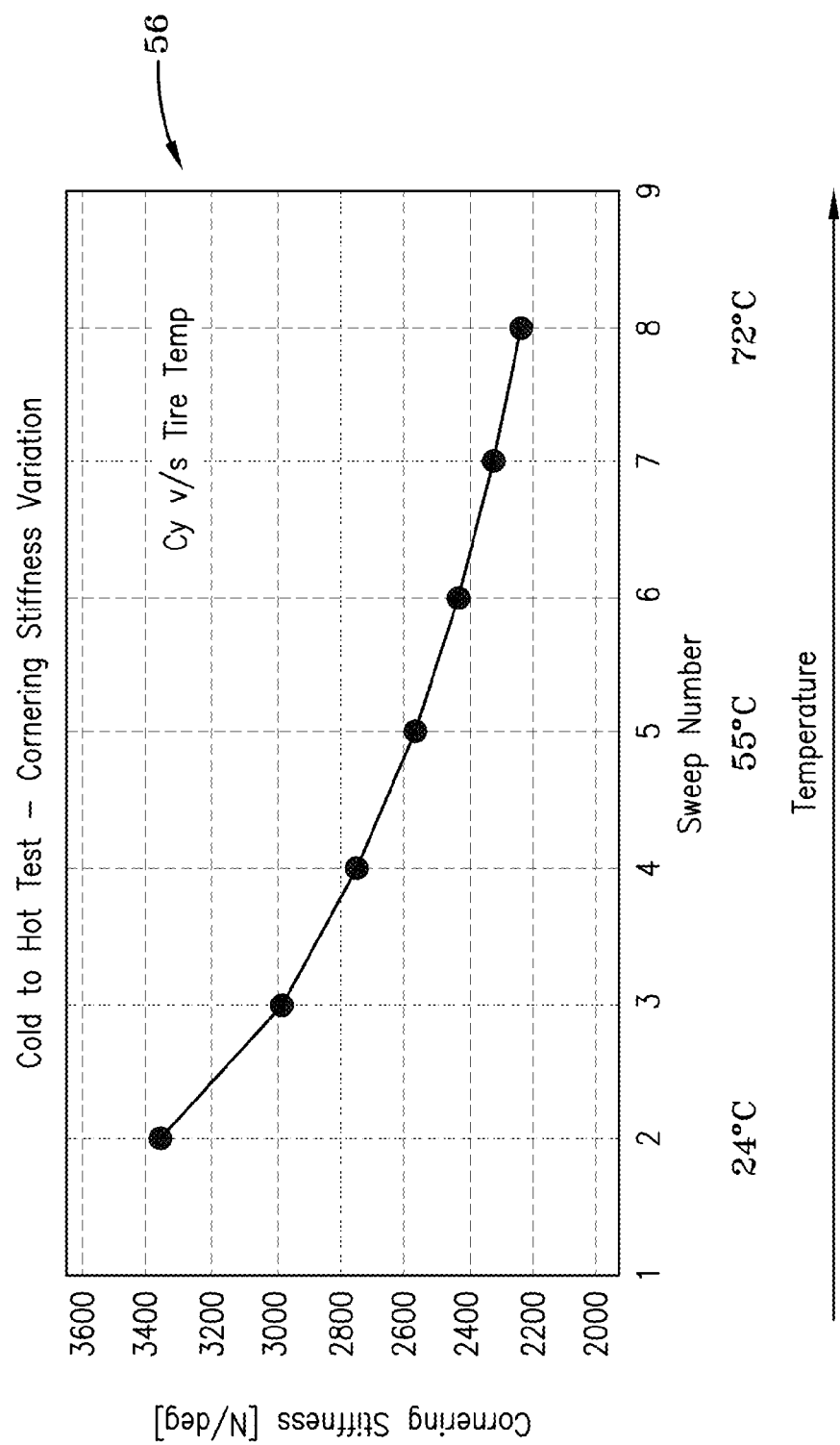
FIG. 9 is a graph showing temperature sensitivity in a cold to hot test wherein cornering stiffness to sweep number [Cy vs. tire temp] is shown for three tire temperatures.

It is further verified experimentally that cornering stiffness and tire temperature are dependent. In FIG. 9, graph 56 plots temperature sensitivity in a cold to hot test wherein cornering stiffness to sweep [Cy vs. tire temp] is shown for three tire temperatures. As the temperature increases, cornering stiffness [N/deg] decreases. Thus, it is seen and has been experimentally verified that cornering stiffness is a function of load, tire pressure and tire temperature; and that tire wear estimation is a function of all four variables: load, pressure, temperature, and cornering stiffness.

Figure 10:
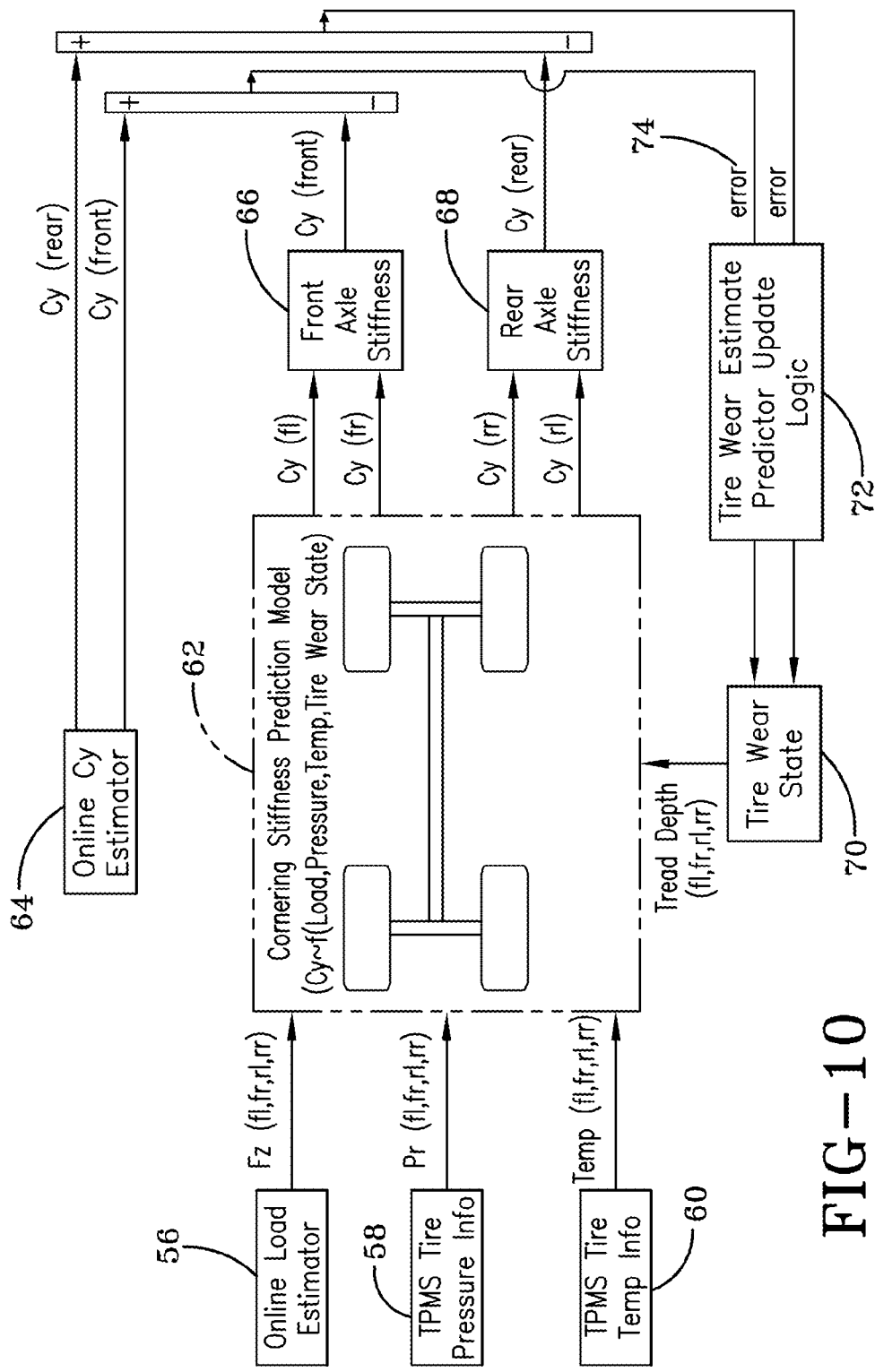
FIG. 10 is a tire wear state estimation implementation flowchart.
Figure 11:
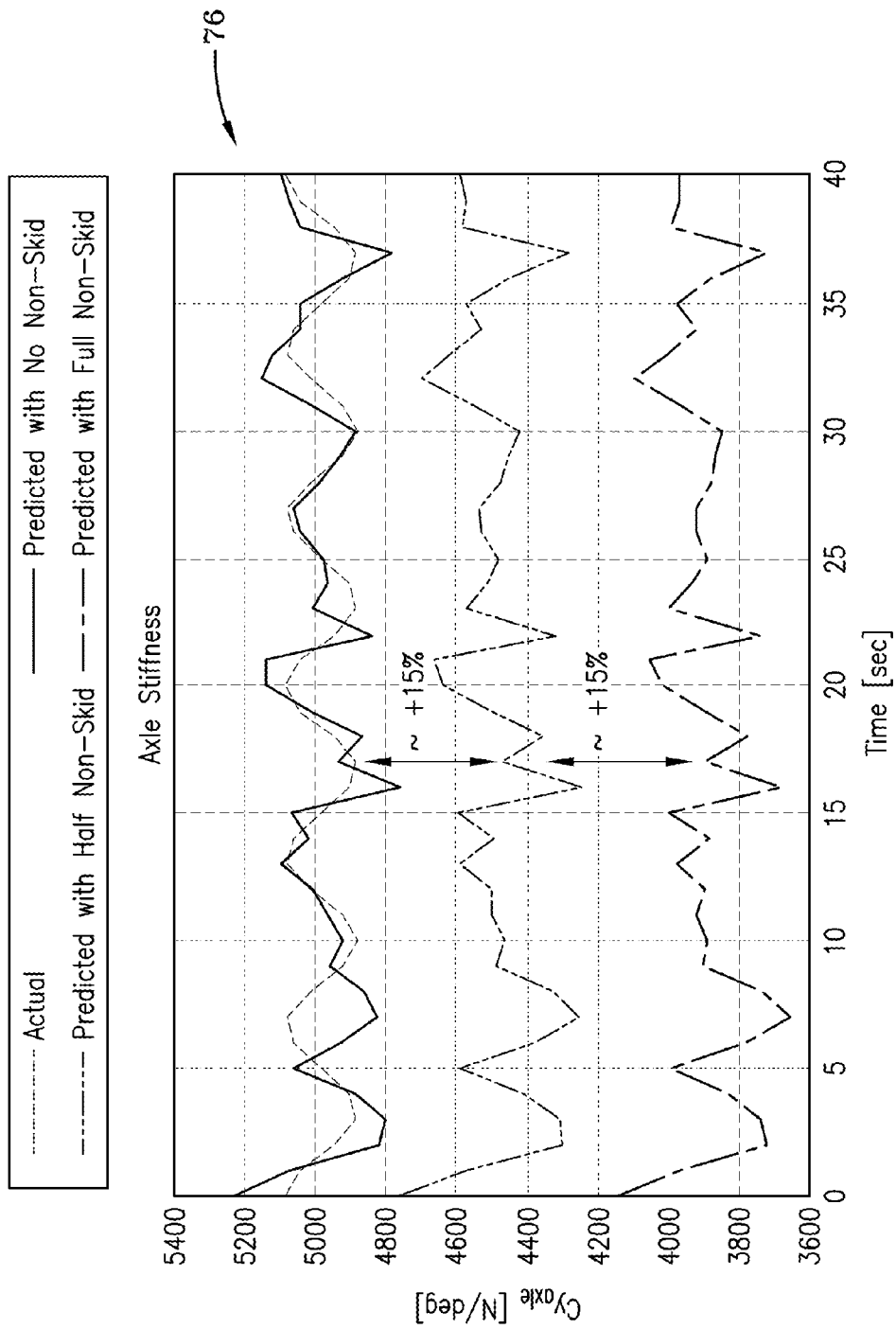
FIG. 11 is a graph of cornering stiffness Cy [N/deg] vs. time showing predicted (no tread, half tread, and full tread tire wear levels) vs. actual verifying the accuracy of the estimates.

FIG. 10 represents a tire wear state estimation implementation flowchart. An online load estimator 56, TPMS tire pressure information 58, and TPMS tire temperature information 60 are all inputs to a cornering stiffness prediction model 62. Cornering stiffness Cy is a function of load, pressure, temperature, and tire wear state. Accordingly, estimated cornering stiffness, tire temperature and pressure measurements from a TPMS module (18 in FIG. 2); and an online load estimation, may be collectively used in order to generate a tire wear estimate. Online Cy estimator 64 provides Cy (rear) and Cy (front) axle estimates. The cornering stiffness model receives tire wear state 70 as an input and generates front left and right, and rear left and right cornering stiffness estimates. The estimates are used to output front axle stiffness 66 and rear axle stiffness 68 which are compared against the online Cy estimator 64 estimates. Update logic 72, using any take detected error 74, updates the tire wear state 70 into the model 62.

The tire identification data is stored within a tag of commercially available type, housed preferably but not necessarily within the TPMS module 18. The tire ID tag transmits tire identification to a remote device such as a computer for use in analyzing tire type and construction. Thus, both pressure data and tire ID are stored within the tire and transmitted therefrom for use in the subject system and method.

An online load estimator in the form of a vehicle based sensor or sensors may be used in a conventional manner to generate a load estimation on the tires by measuring suspension vertical deflection. Such measured load estimation data is available via the vehicle CAN Bus. Alternatively, and preferably, a tire-based system for load estimation may be employed. Such a system is taught in U.S. Pat. No. 8,661,885 entitled "Tire Sidewall Load Estimation System and Method", and issued Mar. 4, 2014, incorporated by reference in its entirety herein. In the tire-based system, sidewall sensors measure sidewall stress and a tire loading is derived by analyzing sidewall stress signals. Such a system and method provides tire-sensor derived tire loading data that, with tire-tag accessed identification data and tire sensor-based pressure data, provide inputs into the subject system and method as described. In the preferred application, tire load estimation, tire pressure, and tire ID are derived from tire-based tag/sensor data.

The graph 76 shows a representative plot of Cy axle [N/deg] vs. time. Actual and predicted results are compared for half non-skid tread depth, no non-skid tread depth and full tread depth tire wear states. Simulation conditions were at a tire inflation of 37 psi. The graphs reflect that the estimates were accurate vs. actual.

Figure 12:
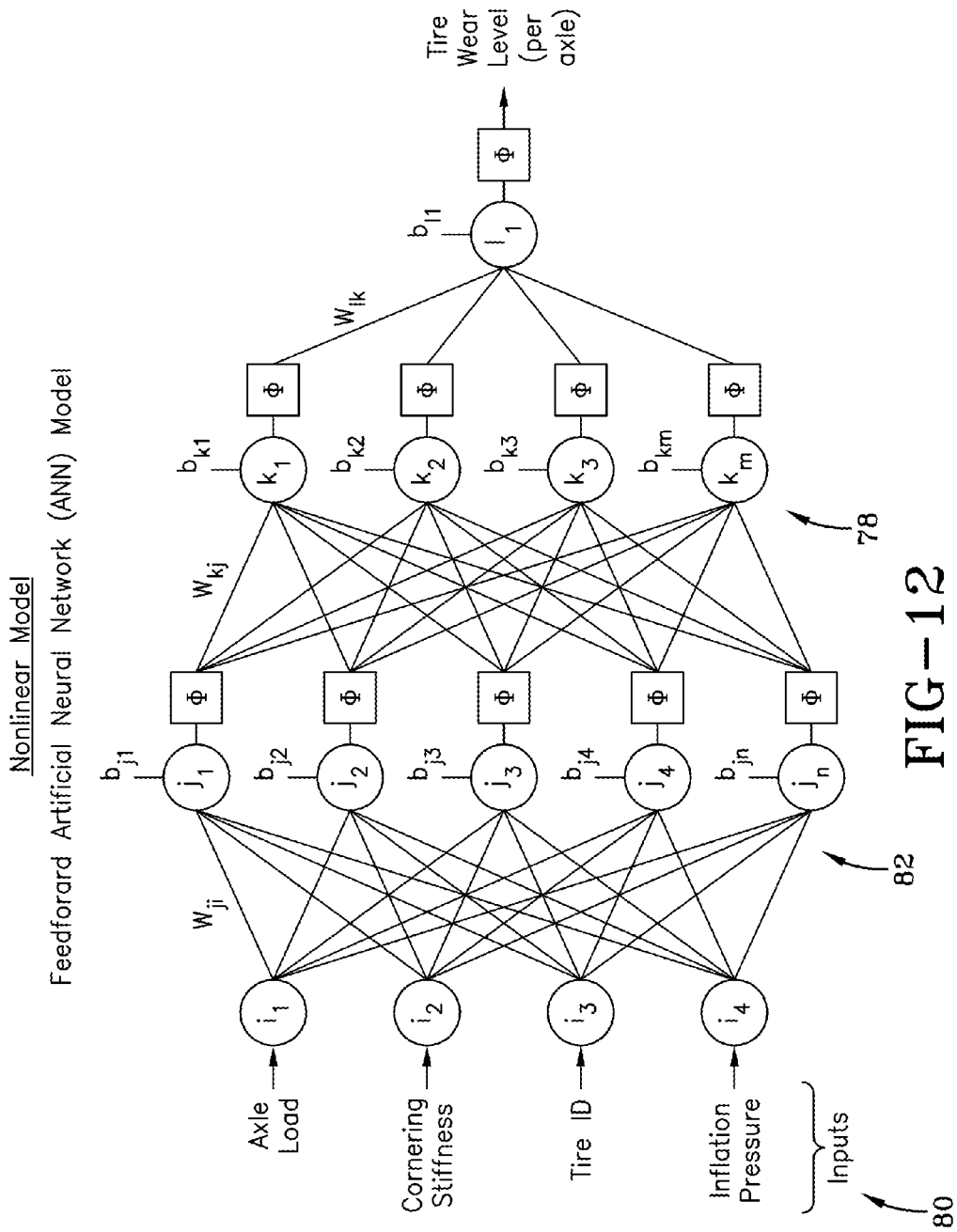
FIG. 12 is a nonlinear model of a feed forward artificial neural network (ANN) using axle load, cornering stiffness, tire ID, and inflation pressures as inputs and producing as output a tire wear level estimation per axle.

FIG. 12 for the purpose of illustration shows a nonlinear, feed forward artificial neural network (ANN) model 78 for estimating tire wear level per axle. The inputs 80 of tire ID, inflation pressure, temperature, and online cornering stiffness (Cy) estimator information are applied to the ANN 82. The ANN 82 is a non-linear statistical data modeling tool used to model complex relationships between inputs and outputs or to find patterns in data. Through the use of the ANN network, the relationships between the inputs are analyzed in order to derive a desired output which, for the subject task, is the tire wear level per axle.

Figure 13:
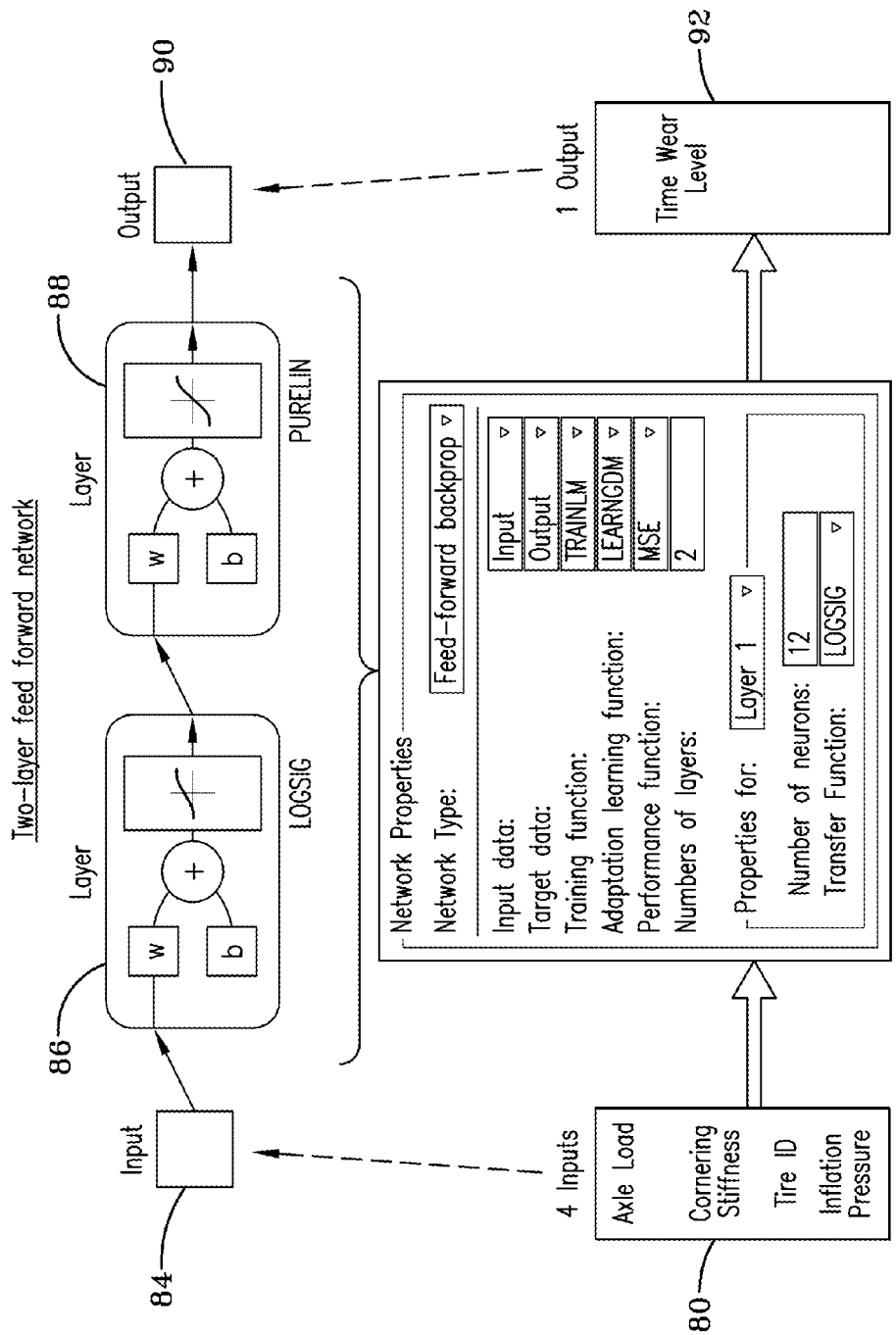
FIG. 13 is a diagram of ANN architecture for a two-layer feed-forward network using the four inputs and yielding the tire wear level estimation.

FIG. 13 shows ANN Architecture for a two-layer feed forward network. The input 84 consists of the identified four input variables 80. The two layers 86, 88 model the relationship between the inputs to derive output 90, time wear level 92. The training of the network is accomplished by adjusting the weights and is carried out through a large number of training sets and training cycles (epochs). The goal of the learning procedure is to find the optimal set of weights which, in the ideal case, would produce the right output for any input. The output of the network is compared with a desired response to produce an error. Once the ANN is adequately trained, it can generalize to similar cases, which it has never seen.

Figure 14:
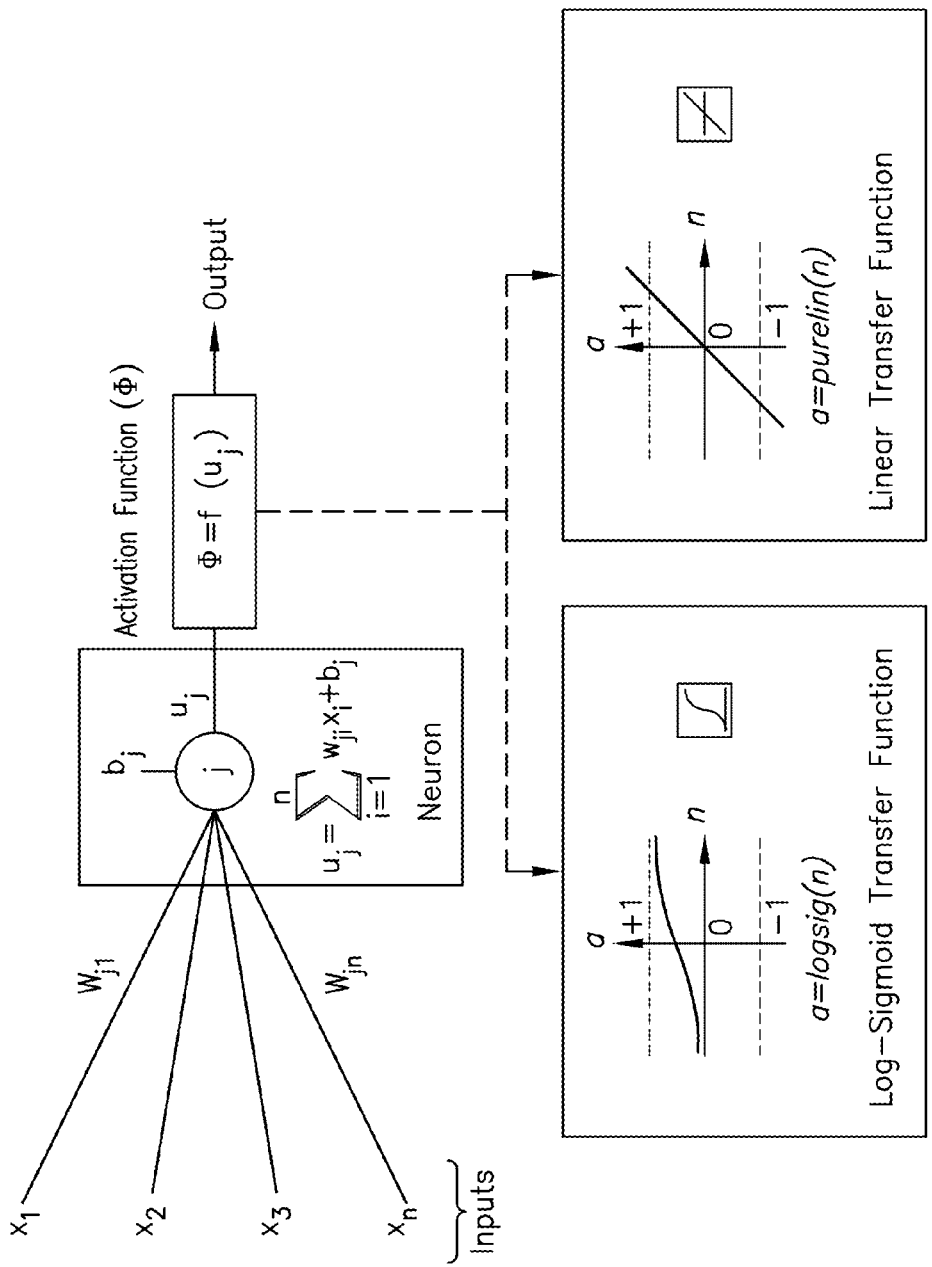
FIG. 14 is a diagram of the ANN Activation function.
Figure 15:
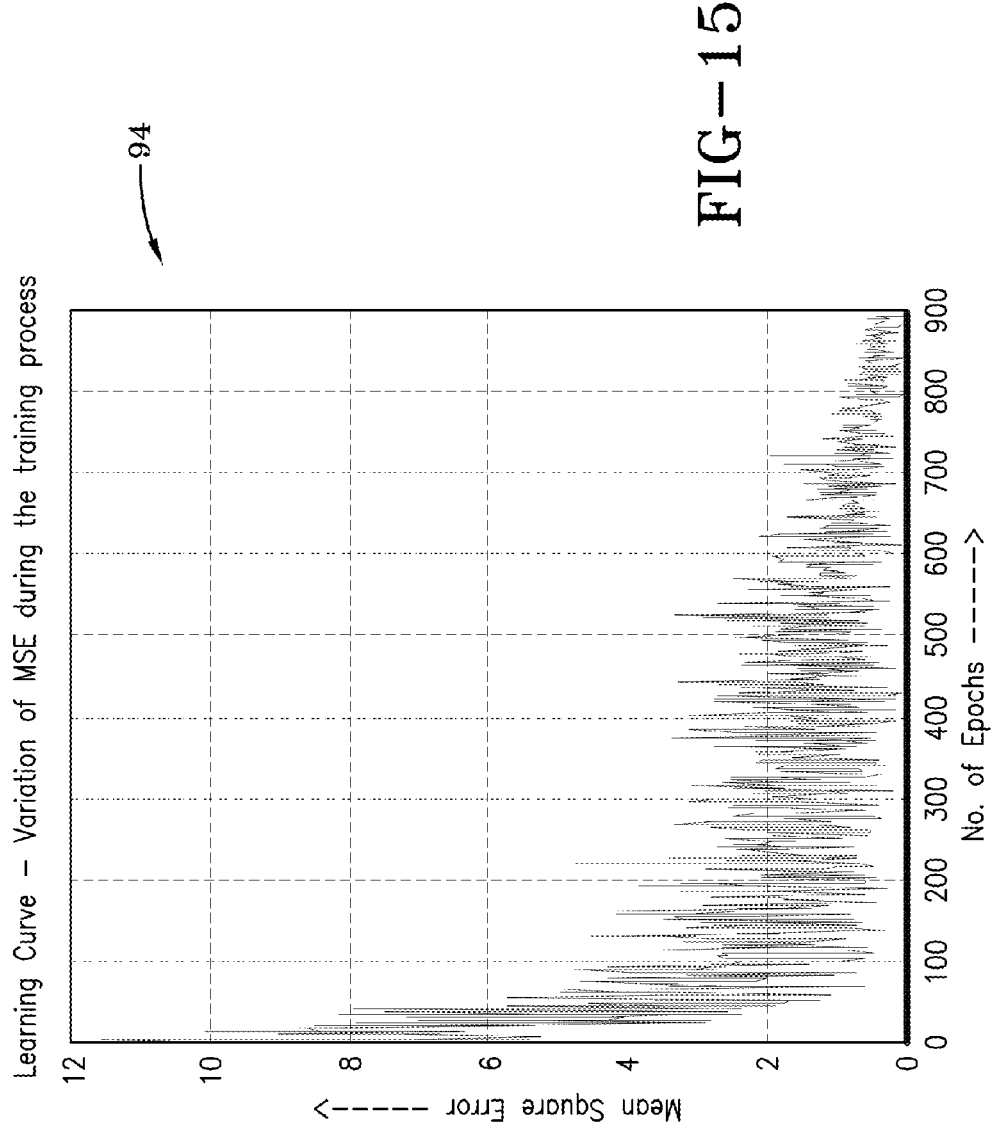
FIG. 15 is a graph of training performance showing learning curve variation of MSE during the training process.
Figure 16:
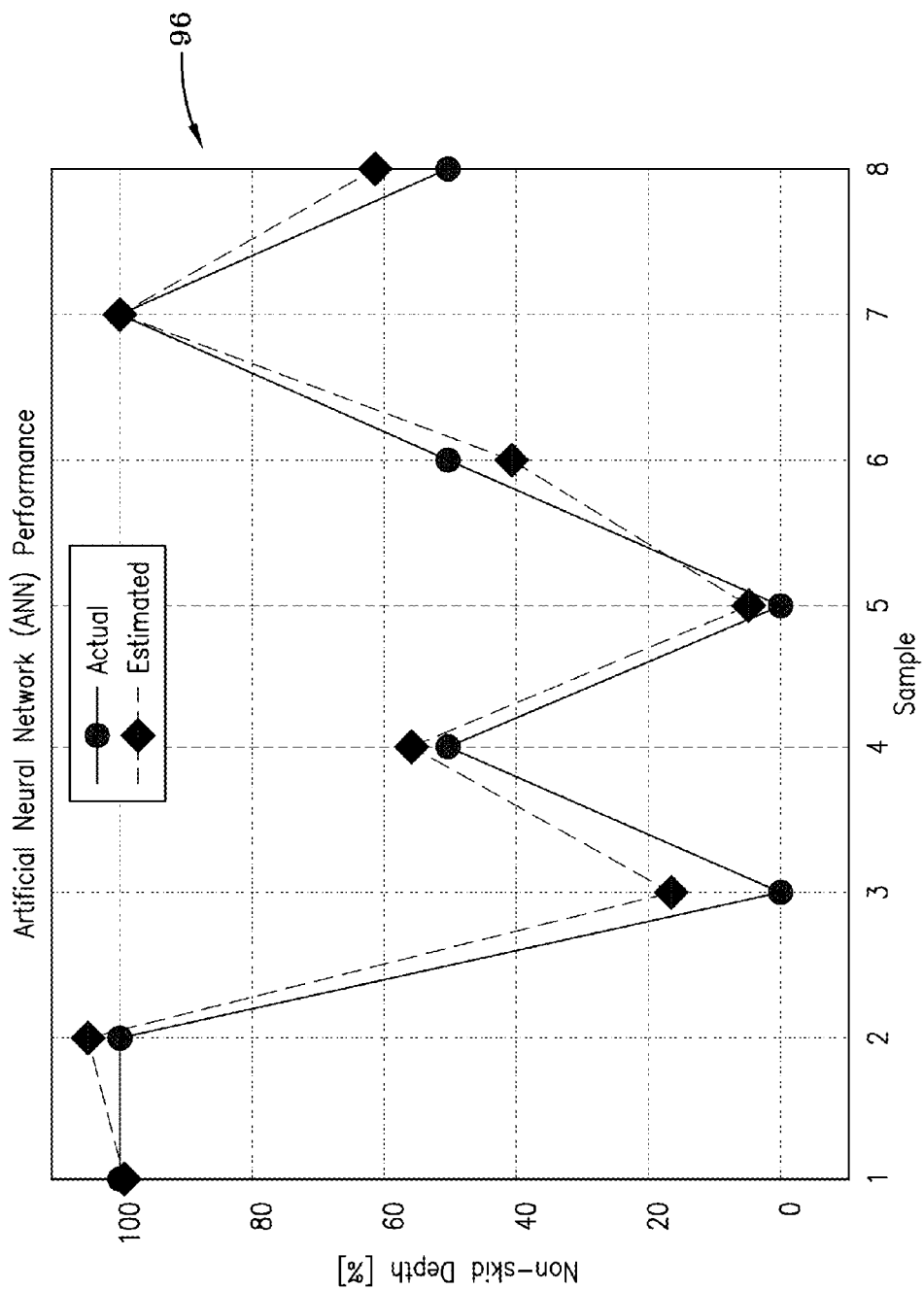
FIG. 16 is a graph of ANN Performance indicating accuracy of tire estimation.

FIG. 14 shows the ANN Activation Function ($\Phi$). The activation function for hidden layers is log sig and linear for output layer. The ANN Performance is depicted by the graphs 94 and 96 of FIG. 15 and FIG. 16, respectively. In FIG. 15, learning curve variation of mean square error (MSE) is plotted against number of epochs. The percent training method is back-propagation algorithm; the 5 training criteria is MSE (mean square error)=1/100; and the percent activation function for hidden layers is log sig and linear for output layer. In FIG. 16, the graph 96 of non-skid depth [percent] to sample for actual and estimated shows the neural networks produce reasonably accurate estimates of the tire wear level. The non-skid depths of 100 percent (new tire), 50 percent (half-worn tread) and 0 percent (completely worn tread) are identifiable in the graph 96.

Figure 17:
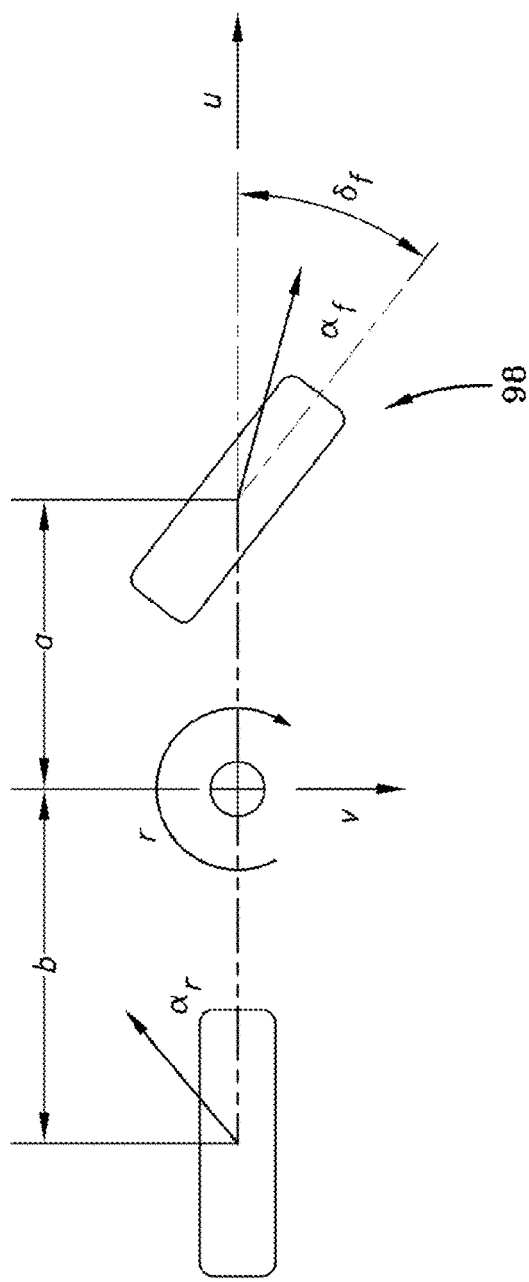
FIG. 17 is a diagram of an equivalent single vehicle scheme.

As discussed previously, cornering stiffness is one variable input used in the ANN to estimate tire wear level. The method of estimating tire cornering stiffness on a vehicle for the purpose of estimating tire wear level is provided below. In FIG. 17, a generic single track vehicle model, wherein:
a=distance from CG to front axle
b=distance from CG to rear axle
u=longitudinal speed
v=lateral speed
r=yaw rate
$\alpha f$=front axle slip angle
$\alpha r$=rear axle slip angle
$\delta f$=road wheel angle Treatise treatments of vehicle sideslip, cornering stiffness, and vehicle modeling, incorporated herein by reference, include:
(1) "Estimation of Vehicle Sideslip, Tire Force, and Wheel Cornering Stiffness", Guillaume Baffet (a), Alip Charara (a), Daniel Lechner (b)
  (a) HEUDIASYC Laboratory, UMR CNRS 6599, Universite de Technologie de Complegne, Centr de recherché Royallie, BP20529, 60205 Compiegne, France;
  (b) INRETS-MA Laboratory, Department of Accident Mechanism Analysis, Chemin de la Croix Blanche, 13300 Salon de Provence, France.
(2) "An Enhanced Generic Single Track Vehicle Model and its Parameter Identification for 15 Different Passenger Cars", Bart Niessen, Sven Jansen, Igo Besselink, Antoine Schmeitz, Henk Nijmeijer, Eindoven University of Technology.
(3) "Vehicle System Dynamics" International Journal of Vehicle Mechanics and Mobility", http://www.tandfonline.com/loi/nvsd20.
(4) "Cornering Stiffness Estimation Based on Vehicle Lateral Dynamics", C. Sierra (a), E. Tseng (b), A. Jain (a), H. Peng (a):
  (a) Department of Mechanical Engineering, University of Michigan, Ann Arbor, Mich.; and
  (b) Research/Advanced Engineering, Ford Motor Company, Published 4 Apr. 2007.

In general, there are several methodologies for estimating cornering stiffness. The "ay method" is to eliminate reliance on the derivative of vehicle yaw rate. The "rdot-method" is a second method for cornering stiffness estimation. A third approach is the "beta-less method", a simplified scheme which estimates cornering stiffness without consideration of beta, the vehicle sideslip angle, in its calculation. For the beta-less scheme, the following expression is utilized:

$$F_{front} = \begin{bmatrix} F_{rear} & \delta_f - \dfrac{(a+b)r}{u} \end{bmatrix} \begin{bmatrix} \dfrac{C_f}{C_r} \\ C_f \end{bmatrix}$$

Where in:
Ffront=front axle force
Frear=rear axle force
Cfront=front cornering stiffness
Crear=rear cornering stiffness The above expression is in the standard parameter identification form as:

$$y = \psi^T \theta$$

Hence the unknown parameters Cf and Cr are estimated using a recursive least square algorithm.

The procedure for solving the RLS problem is as follows:
Step 0: Initialize the unknown parameter $\theta(0)$ and the covariance matrix P(0); set the forgetting factor $\lambda$.
Step 1: Measure the system output y(t) and compute the regression vector $\phi(t)$.
Step 2: Calculate the identification error e(t):

$$e(t) = y(t) - \phi^T(t) \cdot \theta(t-1)$$

Step 3: Calculate the gain k(t):

$$k(t) = P(t-1)\phi(t)[\lambda + \phi^T(t)P(t-1)\phi(t)]^{-1}$$

Step 4: Calculate the covariance matrix:

$$P(t) = (1 - k(t)\phi^T(t))\lambda^{-1} P(t-1)$$

Step 5: Update the unknown parameter:

$$\theta(t) = \theta(t-1) + k(t)e(t)$$

Step 6: Repeat Steps 1 through 5 for each time step.

The "beta-less method", while representing one approach for estimating cornering stiffness, ignoring beta (vehicle sideslip angle) is not optimal. It will be appreciated that it is important to compensate the acceleration signals from on-board vehicle sensors for vehicle roll and pitch effects. Incorporating a beta (vehicle sideslip angle) estimation into the estimation of vehicle cornering stiffness provides for such a compensation. Accordingly, following is an alternative system and method, which takes into account Beta in its estimation scheme.

Figure 18:
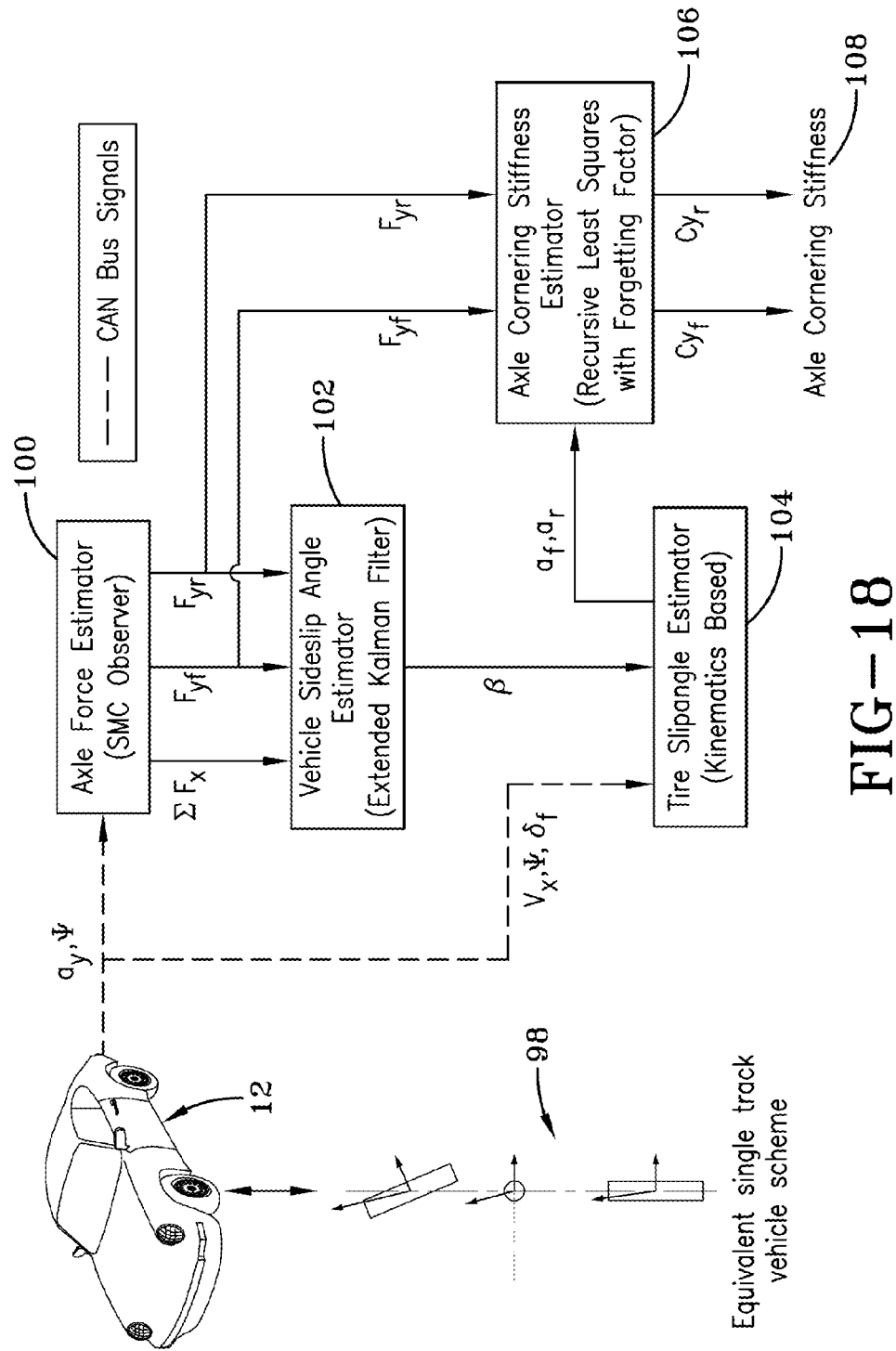
FIG. 18 is a flow chart of an on-vehicle estimation of cornering stiffness in a first scenario using Beta (vehicle sideslip) estimation.

Referring to FIG. 18, a first system block level diagram for on-vehicle estimation of cornering stiffness is shown which utilizes beta (vehicle sideslip) estimation. A vehicle 12 is equipped with on-board sensors and may be represented by the equivalent single track vehicle scheme 98 (shown in detail by FIG. 17). From the vehicle sensors, via vehicle CAN bus signals, $a_y$, $\psi$ are obtained and input into axle force estimator 100. The axle force estimator 100 employs a SMC Observer to derive axle force estimations $\Sigma F_x$, $F_{yf}$, and $F_{yr}$. The axle force estimator 100 applies the following expressions:

$$ma_y = F_{yf} + F_{yr}$$

$$I_z \dot{\psi} = Fyf*lf - Fyr*lr$$

The axle force estimations are input into a vehicle sideslip angle estimator (extended Kalman filter) and vehicle sideslip angle beta (β) is obtained. The vehicle sideslip angle beta and CANBUS signal inputs $V_x$, $\psi$, and $\delta_f$ are inputs to a kinematics based tire slipangle estimator 104 to determine tire slip angle estimations $\alpha_f$, $\alpha_r$. The tire slip angle estimations $\alpha_f$, $\alpha_r$ and axle force estimations $F_{yf}$, $F_{yr}$ are inputs into an axle cornering stiffness estimator 106 consisting of a recursive least squares with forgetting factor algorithm that produces the desired axle cornering stiffness estimation 108. An expression for the model used in the axle cornering stiffness estimator 106 is provided below:

$$F_{yi}(\alpha_i) \approx -K_i \alpha_i - Q_i \alpha_i^3$$

Where in:
Fyi=front/rear axle force
αi=front/rear slip angle
K=Coefficient defining the shape of the tire force curve in the linear region
Q=Coefficient defining the shape of the tire force curve in the nonlinear region The above expression is in the standard parameter identification form as:

$$y = \psi^T \theta$$

Figure 19:
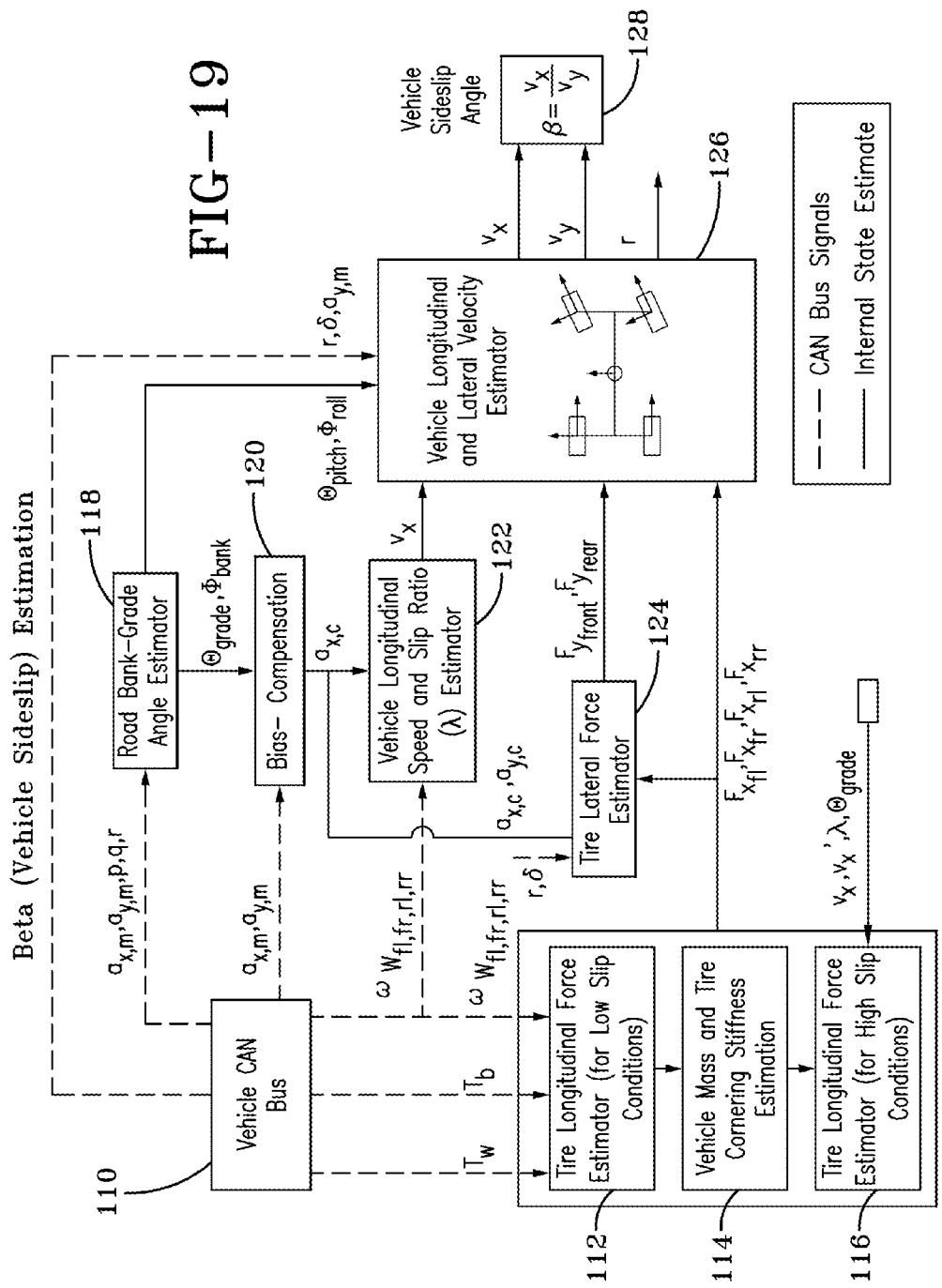
FIG. 19 is a flow chart showing beta (vehicle sideslip) estimation.

Hence the unknown parameters K and Q are estimated using a recursive least square algorithm In FIG. 19, the schematic diagram for the beta (vehicle sideslip) estimation is shown. CAN bus 110 provides signals indicated by broken line while solid lines designate internal state estimations.

The vehicle CAN bus 110 signals provide $T_w$, $T_b$ and $\omega$ to a tire longitudinal force estimator 112 (for low slip conditions) from which vehicle mass and tire braking stiffness estimation 114 and tire longitudinal force estimation (for high slip conditions) are made.

Tire lateral force estimator 124 based on the sliding mode observer principal receives acceleration and yaw rate measurement signals from on-board vehicle sensors 110 and generates estimates of the front and rear axle forces. The measured lateral/longitudinal acceleration has both lateral/longitudinal dynamics components and gravity due to road bank/grade and chassis angles. Using the real-time vehicle roll and pitch angle estimates 118, the measured acceleration signals are compensated for the gravity components 120. An estimate of the vehicle longitudinal speed 122 is made based on the measurement of the four wheel rotational speed and longitudinal vehicle acceleration. Finally, an estimate of the vehicle lateral velocity and eventually vehicle side slip angle is made using a extended Kalman filtering (EKF) based observer formulated using vehicle dynamic equations based on a four wheel vehicle model 126.

Figure 20:
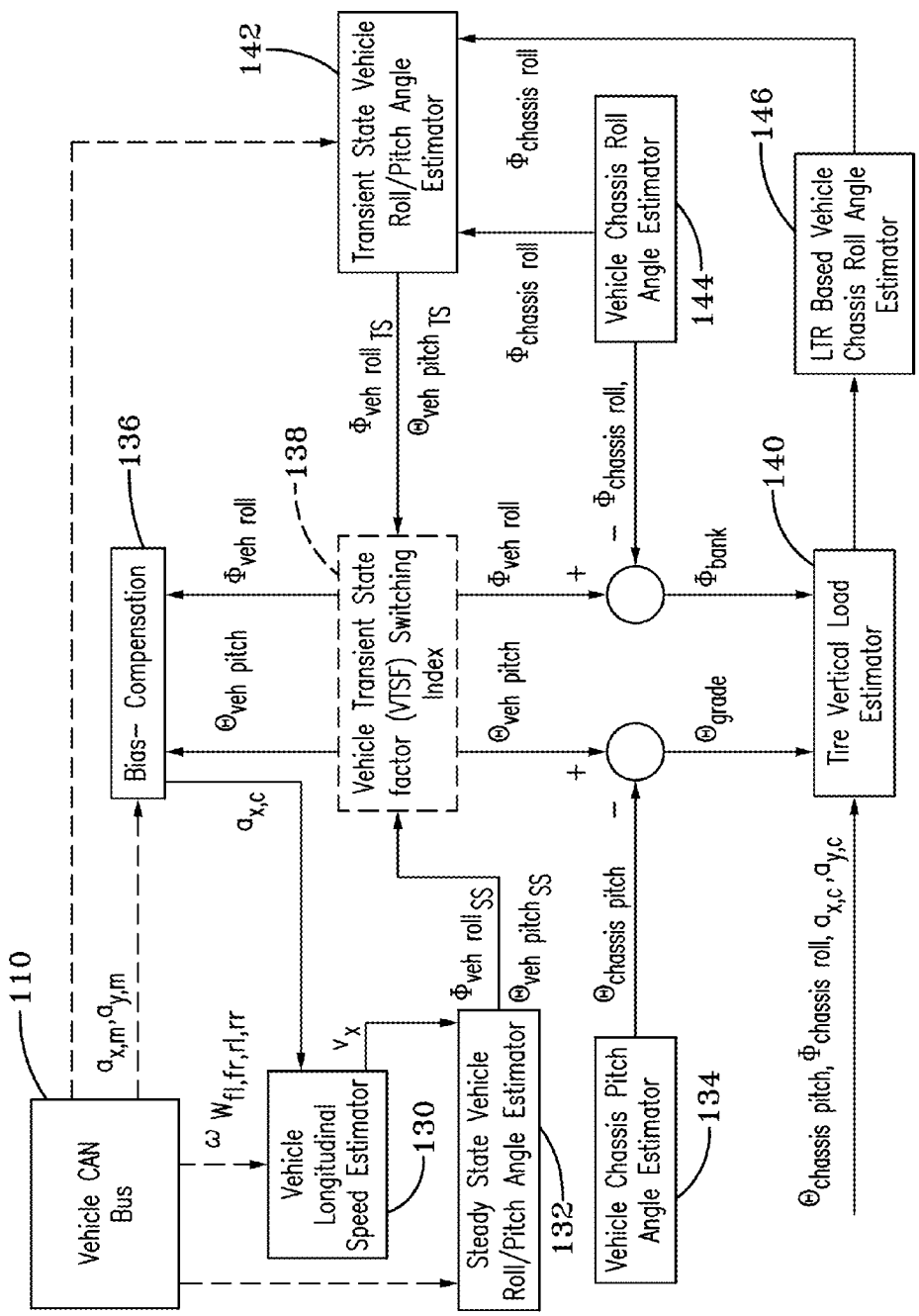
FIG. 20 is a flow chart showing a road bank angle and vehicle roll angle estimator.

FIG. 20 shows a Road bank angle and vehicle roll angle estimator scheme. The vehicle roll angle is estimated using the vehicle steady state and transient state roll angles based on the vehicle state index switching 138. The switching index is used to fuse the steady state 132 and transient state 142 estimates of the vehicle roll angle. An index known as the vehicle transient state factor (VTSF) is defined, which represents the state of the vehicle (i.e. VTSF=1 (Transient State); VTSF=0 (Steady State)). The vehicle transient state factor (VTSF) is characterized as a function of the vehicle roll rate, derivative of the steering wheel angle and yaw rate.

Figure 21A:
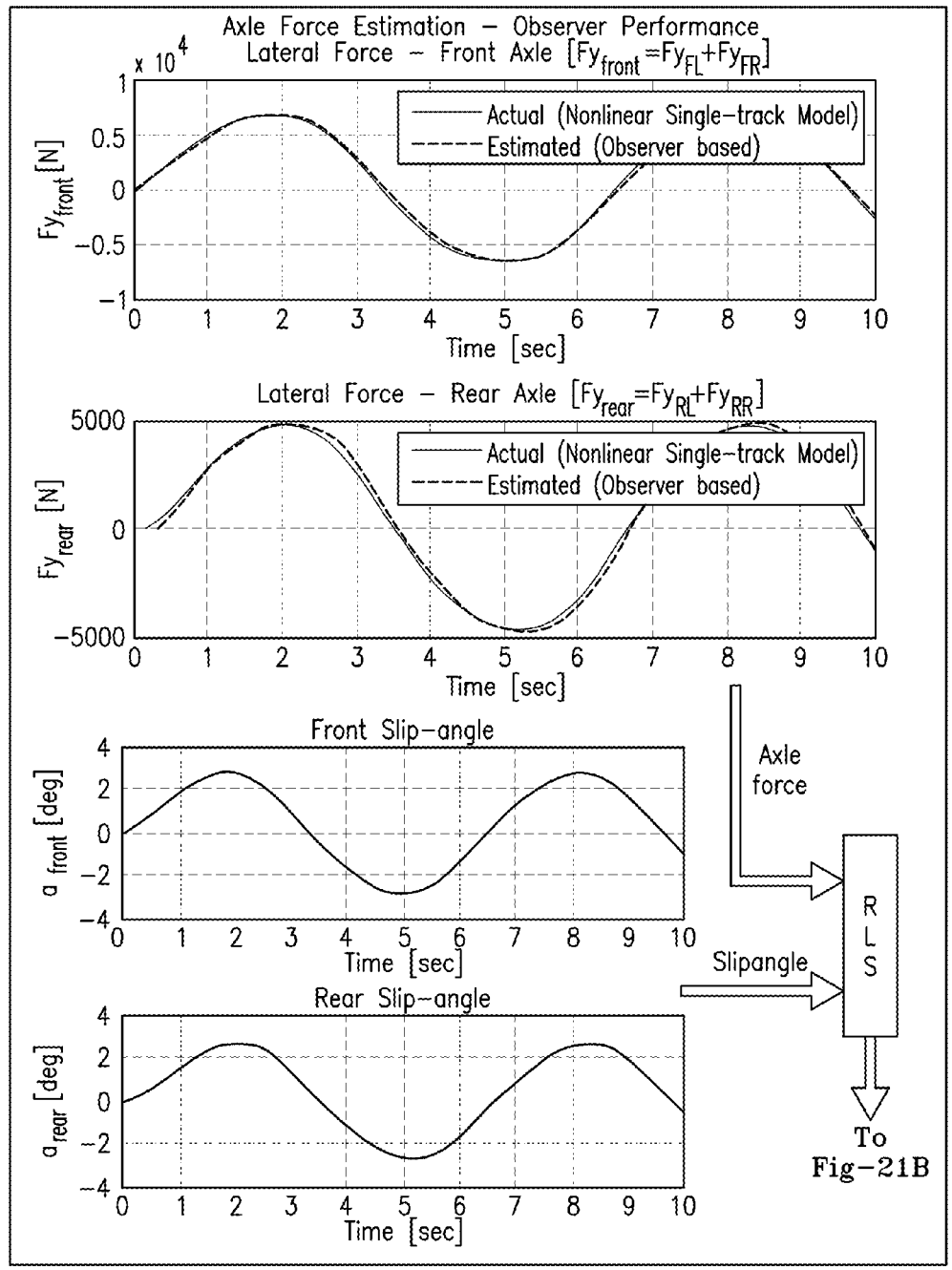
FIG. 21A is a series of graphs of axle force estimation observer performance providing axle slip angle and axle force inputs into a RLS algorithm.
Figure 21B:
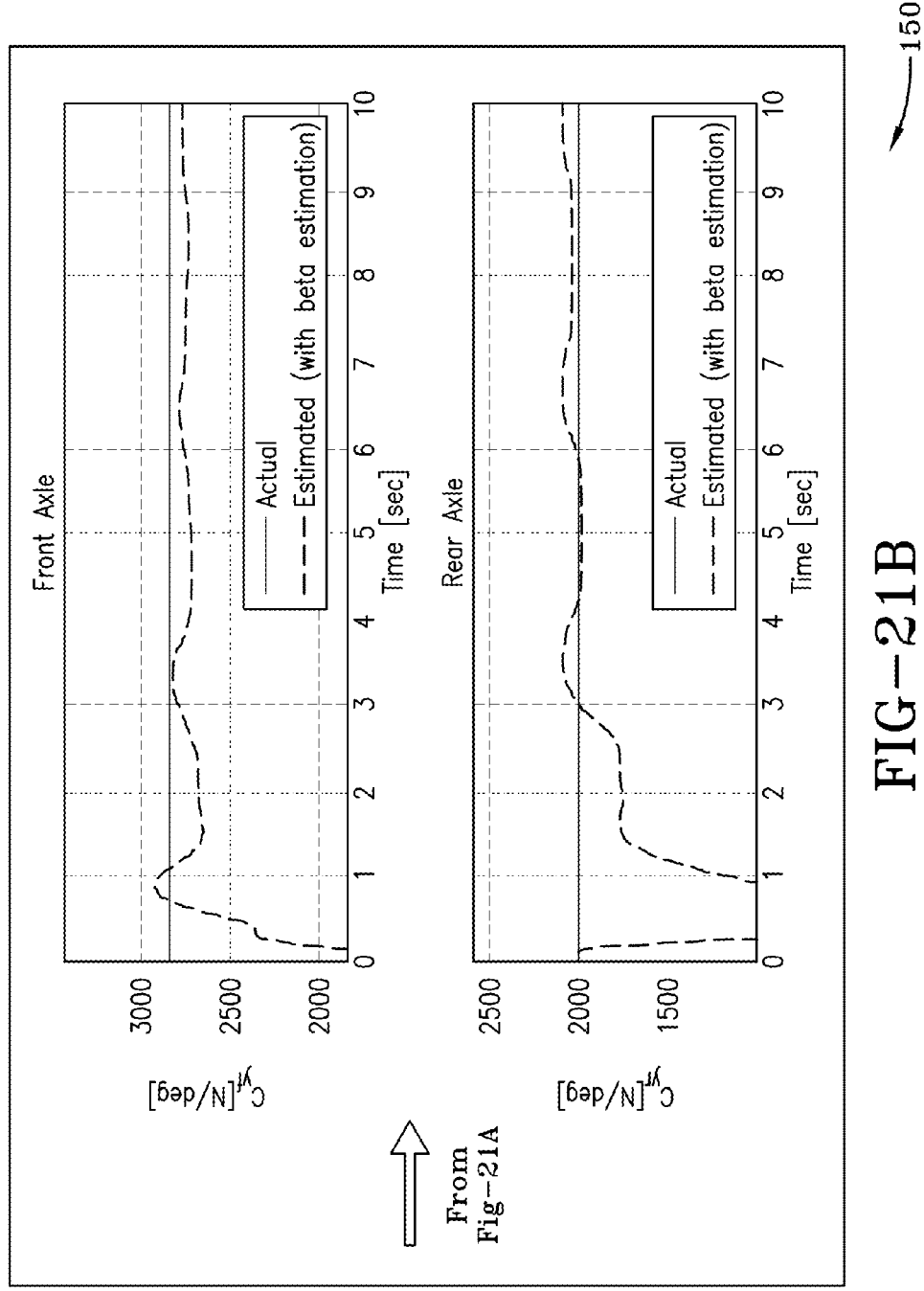
FIG. 21B are front and rear axle graphs for embodiment 1, inclusive of beta (vehicle side slip) estimation.

FIG. 21A shows axle force estimation-observer performance graphs 148 illustrating the axle force estimation and comparing observer performance with actual (nonlinear single-track model). The RLS (recursive least squares) algorithm yields cornering stiffness estimations that are graphically shown in FIG. 21B at 150, and which compare actual with estimated (with beta estimation) results.

Figure 22:
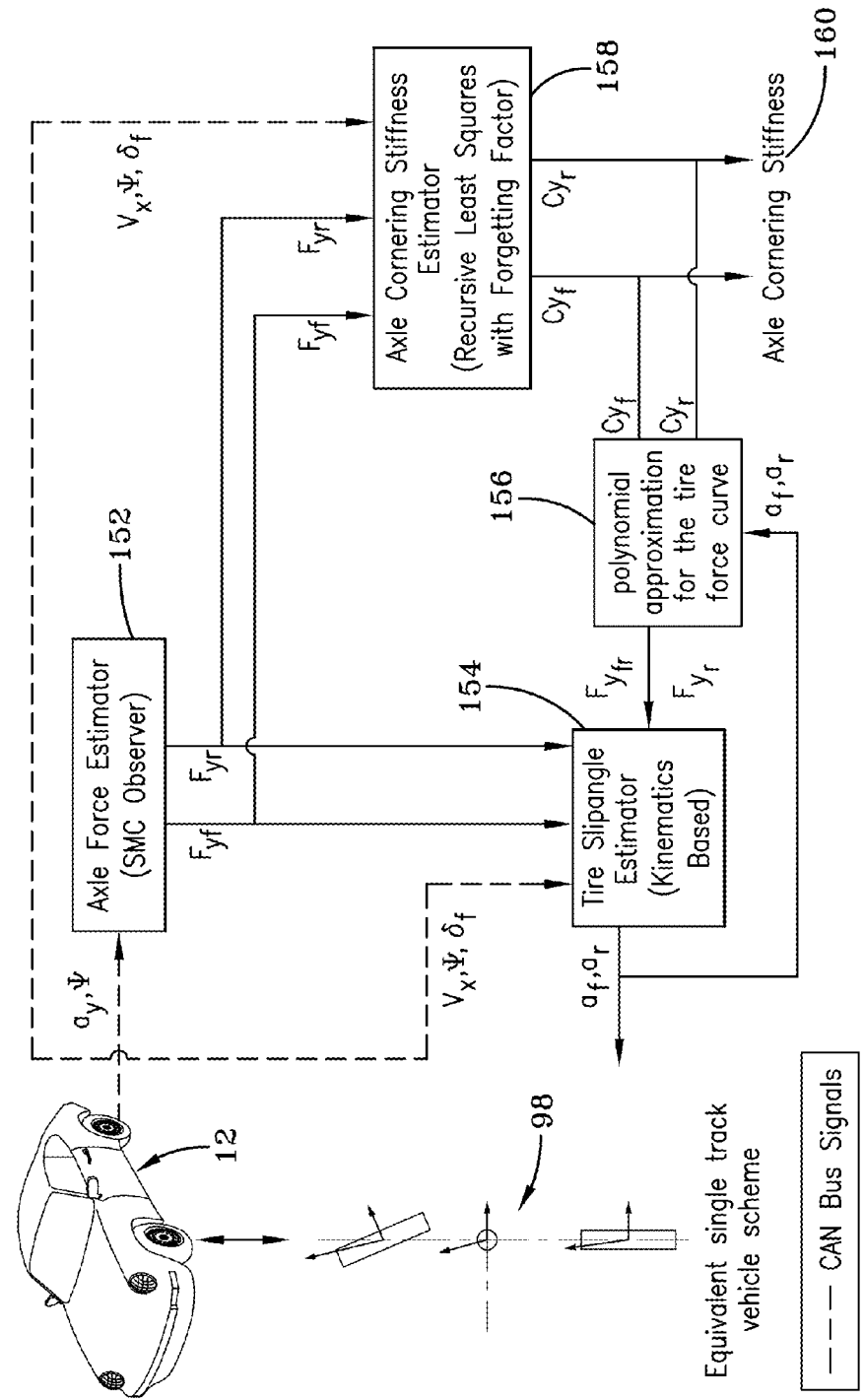
FIG. 22 is a flow chart of a second embodiment or scenario, beta-less (without vehicle side slip) estimation.
Figure 23A:
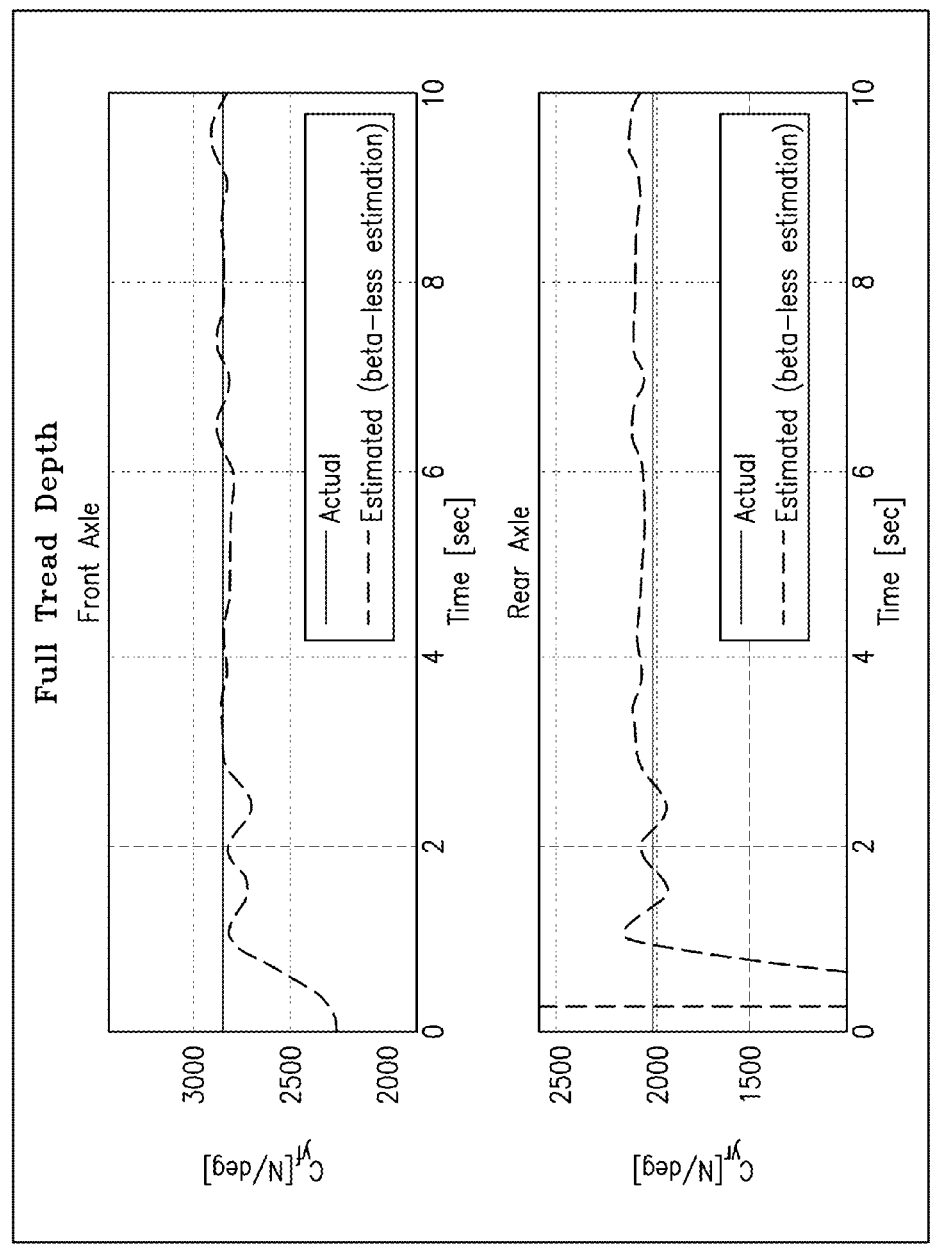
FIG. 23A are front and rear axle graphs for the second (beta-less) embodiment showing full tread depth estimator performance comparing actual to estimated.
Figure 23B:
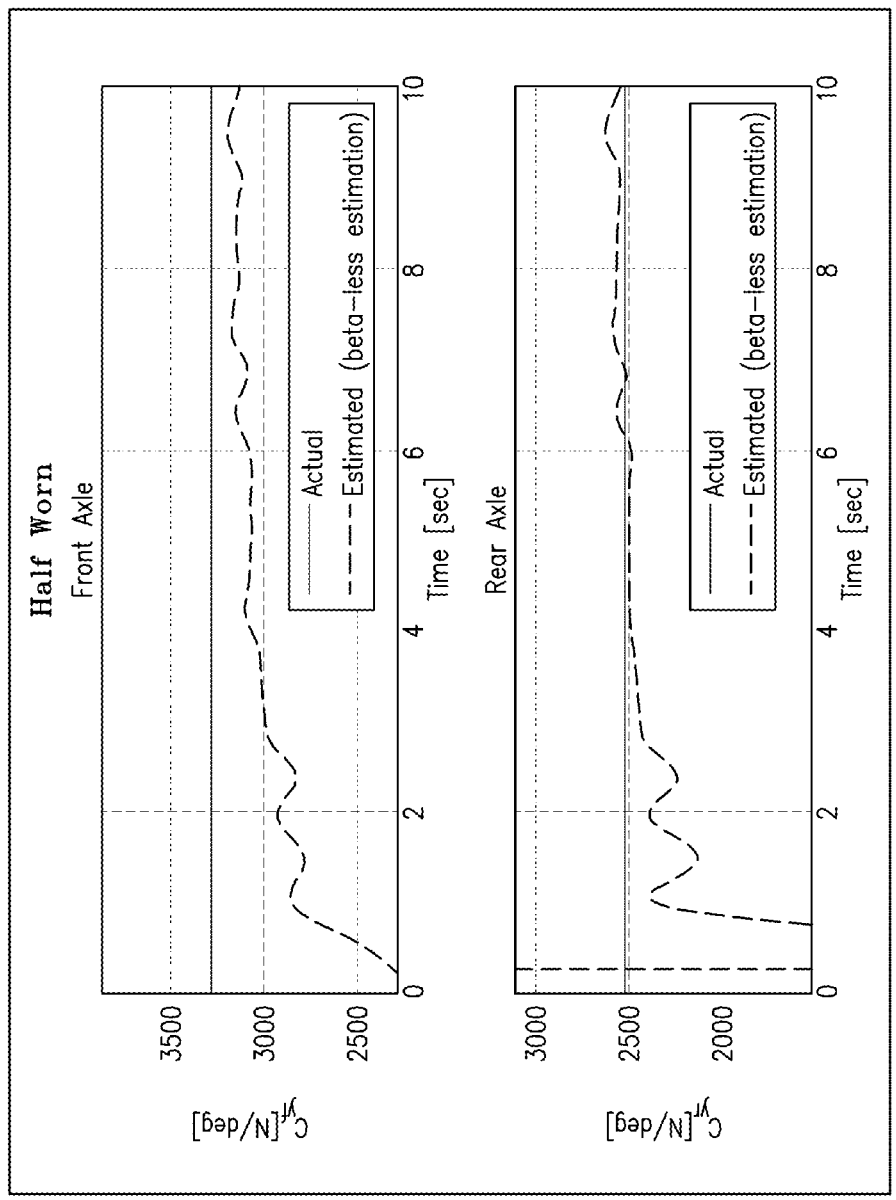
FIG. 23B are front and rear axle graphs for the second (beta-less) estimator showing half worn tread depth estimated to actual results.

FIG. 22 shows a beta-less embodiment for estimated cornering system. In the beta-less (without vehicle sideslip) schematic diagram, the vehicle 12 is represented by the equivalent single track vehicle scheme 98. An axle force estimator (SMC Observer) receives acceleration and yaw rate measurement signals from on-board vehicle sensors and generates an axle force estimation. An axle cornering stiffness estimator (recursive least squares with forgetting factor) 158 uses the axle force estimations and generates axle cornering stiffness estimations which are used in a polynomial approximation for the tire force curve 156 and a tire slipangle estimator (kinematics based) 154 to generate axle slipangle estimations. Performance of the axle cornering stiffness 160 estimated by the beta-less system is summarized in the FIG. 23A full tread depth graphs 160 and the FIG. 23B half-worn tread cornering stiffness vs. time graphs 162, comparing actual to estimated. As seen, the Beta-less approach results in a less accurate estimation than the previously described with-beta embodiment.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A tire wear state estimation system comprising:
   at least one tire supporting a vehicle;
   a tire pressure sensor affixed to the at least one tire for measuring a tire inflation pressure;
   a tire load sensor affixed to the at least one tire for sensing a tire load;
   tire cornering stiffness calculating means for calculating a tire cornering stiffness in the at least one tire;
   a tire identification device affixed to the at least one tire for identifying the at least one tire; and
   a tire wear estimation means for calculating an estimation of a tire wear state based upon inputs comprising the tire inflation pressure, the tire load, the tire cornering stiffness, and the tire identification;
   wherein the tire cornering stiffness calculating means comprises:
   at least one on-board vehicle based sensor;

a cornering stiffness estimator model operatively using vehicle information input from the at least one on-board vehicle based sensor;

wherein the tire pressure sensor comprises a tire-mounted pressure measuring device operative to measure by the tire pressure sensor a tire cavity pressure and transmit tire inflation pressure; and wherein the cornering stiffness estimator model comprises:

an axle force estimator receiving the vehicle information input and operative to generate an axial force component estimation;

a tire slipangle estimator for generating a tire slipangle estimation based on the vehicle information input and the vehicle sideslip angle estimation; and an axle cornering stiffness estimator for generating an axle cornering stiffness estimation based on the tire slip angle estimation and the axial force component estimation.

2. The tire wear state estimation system of claim 1, wherein the axle cornering stiffness estimator comprises a recursive least squares algorithm with forgetting factor based on a polynomial model capturing a dependency between axle force component estimation and the tire slip angle estimation.

3. The tire wear state estimation system of claim 1, further comprising a vehicle sideslip angle estimator operative to generate a vehicle sideslip angle estimation from the axial force component estimation, the tire slip angle estimator generating the tire slip angle estimation based on the vehicle slip angle estimation and the axial force component estimation.

4. The tire wear state estimation system of claim 1, wherein the tire slip angle estimator comprises a sliding mode observer for non-linear systems.

5. A tire wear state estimation system comprising:

a tire supporting a vehicle;

a tire-mounted pressure sensor device affixed to the tire operative to measure a tire pressure within a tire cavity of the tire;

a tire identification device mounted to the at least one tire for providing tire-identification data;

a tire-mounted sensor-based load estimator for estimating a tire load;

a tire cornering stiffness calculation means for calculating a tire cornering stiffness; and tire wear estimation means for calculating an estimation of a tire wear state based upon inputs comprising the tire pressure, the tire load, the tire cornering stiffness, and the tire-identification data;

wherein the tire cornering stiffness calculation means comprises a cornering stiffness estimator model operatively using vehicle information input from at least one on-board vehicle based sensor generating vehicle operational information; and the cornering stiffness estimator model comprises an axle force estimator receiving the vehicle operational information and operative to generate an axial force component estimation based on the vehicle operational information.

6. The tire wear estimation system of claim 5, wherein further comprising:

a vehicle side slip angle estimator for generating a vehicle side slip angle estimation;

a tire slip angle estimator for generating a tire slip angle estimation based on the vehicle information input and the vehicle side slip angle estimation; and an axle cornering stiffness estimator for generating an axle cornering stiffness estimation based on the tire slip angle estimation and the axial force component estimation.

7. The tire wear state estimation system of claim 6, wherein the axle cornering stiffness estimator comprises a recursive least squares algorithm with forgetting factor based on a polynomial model capturing a dependency between axle force component estimation and the tire slip angle estimation.

8. A method of tire wear state estimation comprising:

affixing a tire pressure measuring device to a vehicle-supporting tire, the pressure measuring device having at least one pressure sensor measuring a tire inflation pressure within a tire cavity of the vehicle-supporting tire;

calculating a tire load on the vehicle-supporting tire using a tire-affixed load sensor;

calculating a tire cornering stiffness in the vehicle-supporting tire;

determining a tire identification; and estimating a tire wear state based upon inputs comprising the tire inflation pressure, the tire load, the tire cornering stiffness, and the tire identification; and wherein calculating the tire cornering stiffness comprises:

utilizing an axle force estimator receiving vehicle information input from at least one vehicle-based sensor and operative to generate an axial force component estimation;

utilizing a vehicle side slip angle estimator to generate a vehicle side slip angle estimation;

utilizing a tire slip angle estimator for generating a tire slip angle estimation based on the vehicle information input and a vehicle side slip angle estimation; and utilizing an axle cornering stiffness estimator for generating an axle cornering stiffness estimation based on the tire slip angle estimation and the axial force component estimation.

9. The method of claim 8, wherein further comprising utilizing in the axle cornering stiffness estimator a recursive least squares algorithm with forgetting factor based on a polynomial model capturing a dependency between axle force component estimation and the tire slip angle estimation.

* * * * *